Aug. 22, 1967 L. R. HARPER 3,337,861
DATA TRANSFER DEVICE
Original Filed May 27, 1958 17 Sheets-Sheet 1

INVENTOR
LEONARD R. HARPER

Aug. 22, 1967  L. R. HARPER  3,337,861
DATA TRANSFER DEVICE
Original Filed May 27, 1958  17 Sheets-Sheet 4
FIG. 4
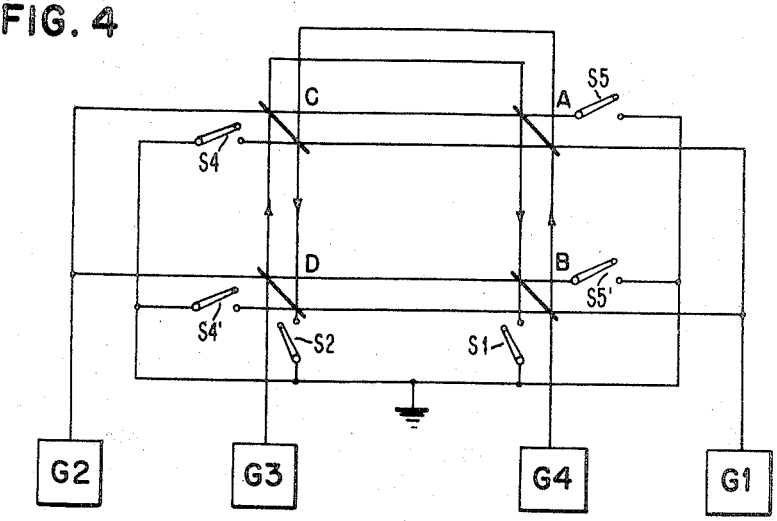
FIG.5a READ X 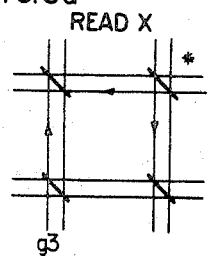
FIG.5b WRITE X 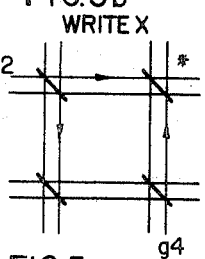
FIG.5c READ Y 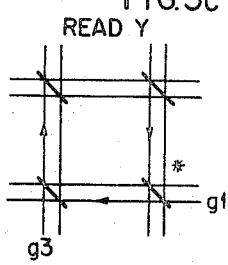
FIG.5d WRITE Y 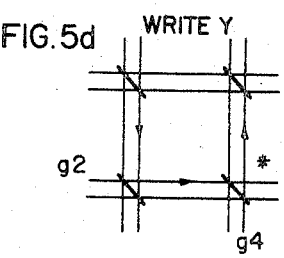
FIG.5e READ X 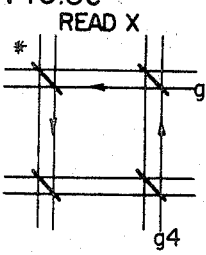
FIG.5f WRITE X 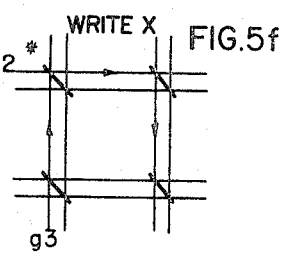
FIG.5g READ Y 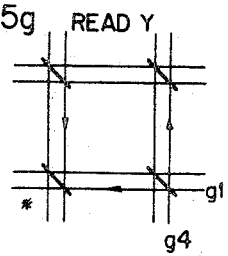
FIG.5h WRITE Y 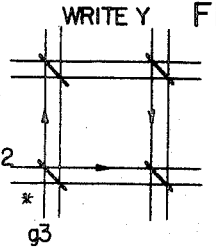

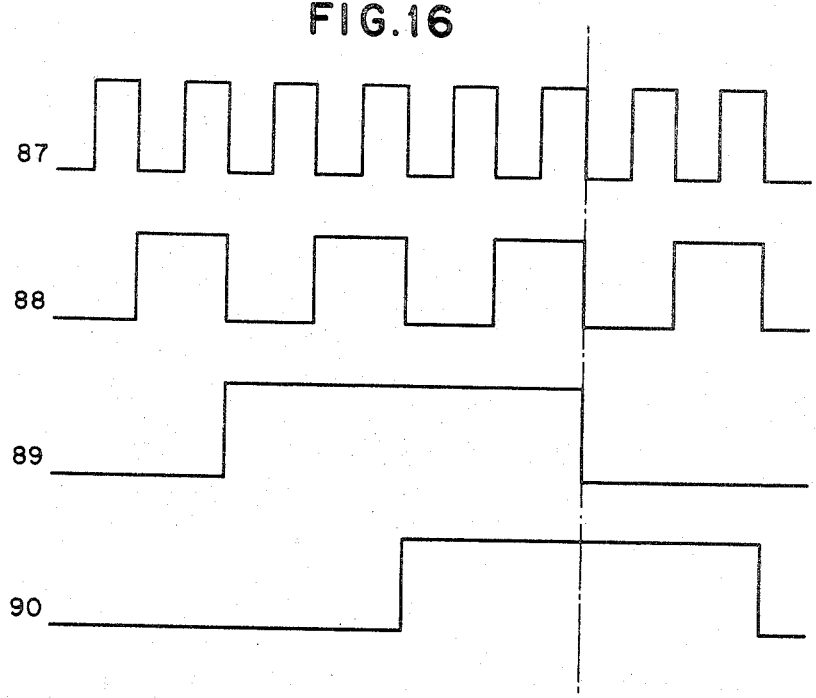

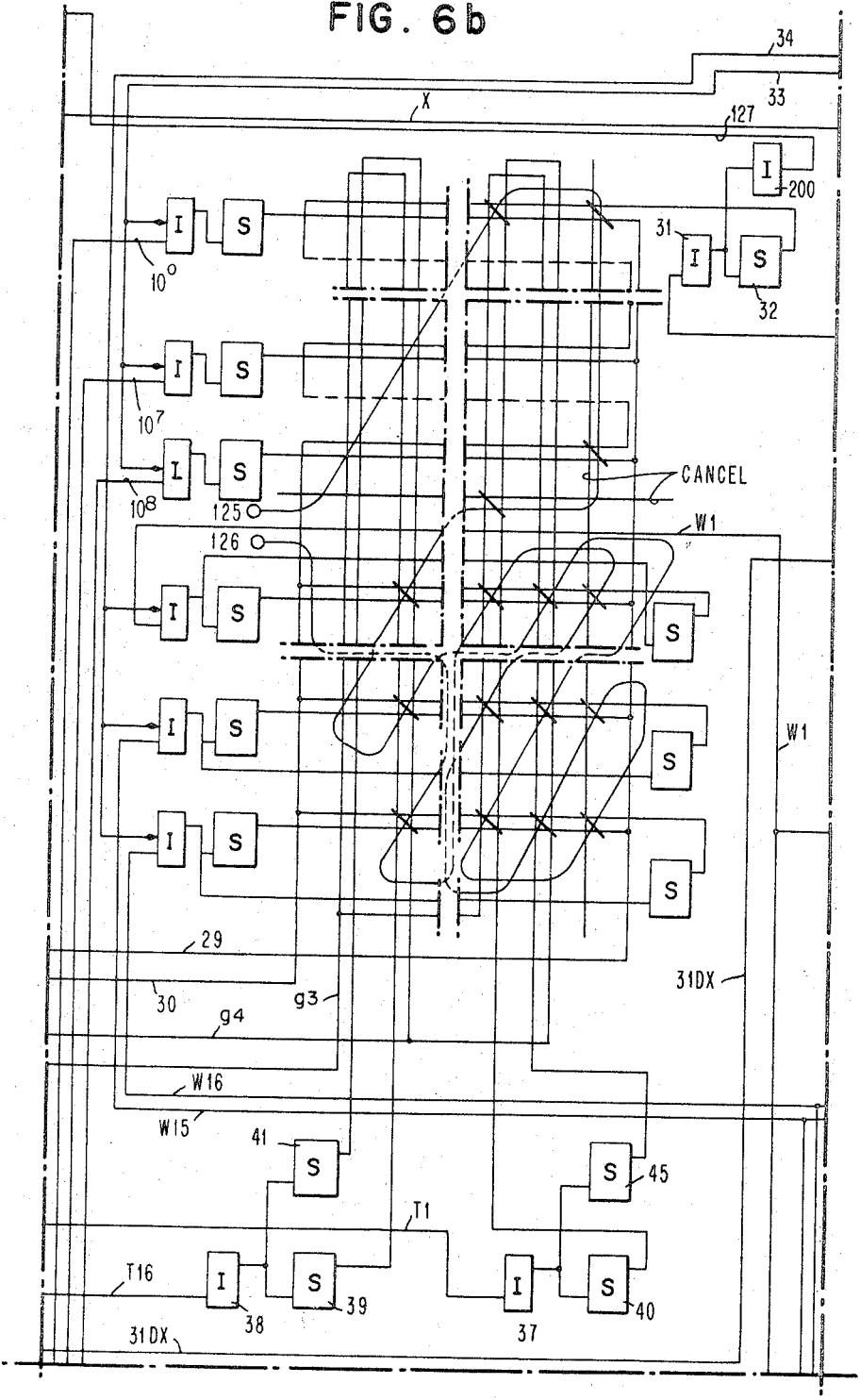

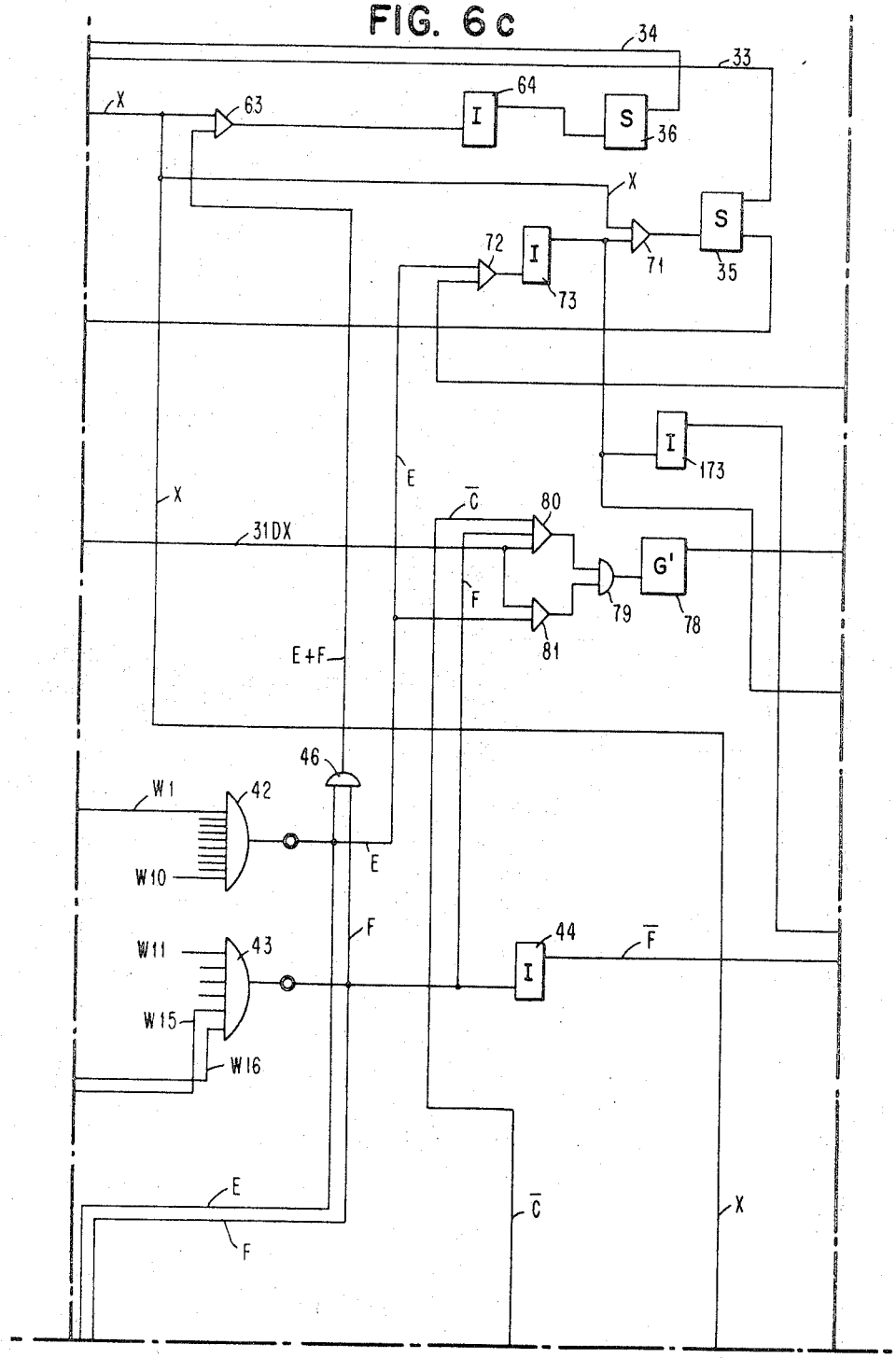

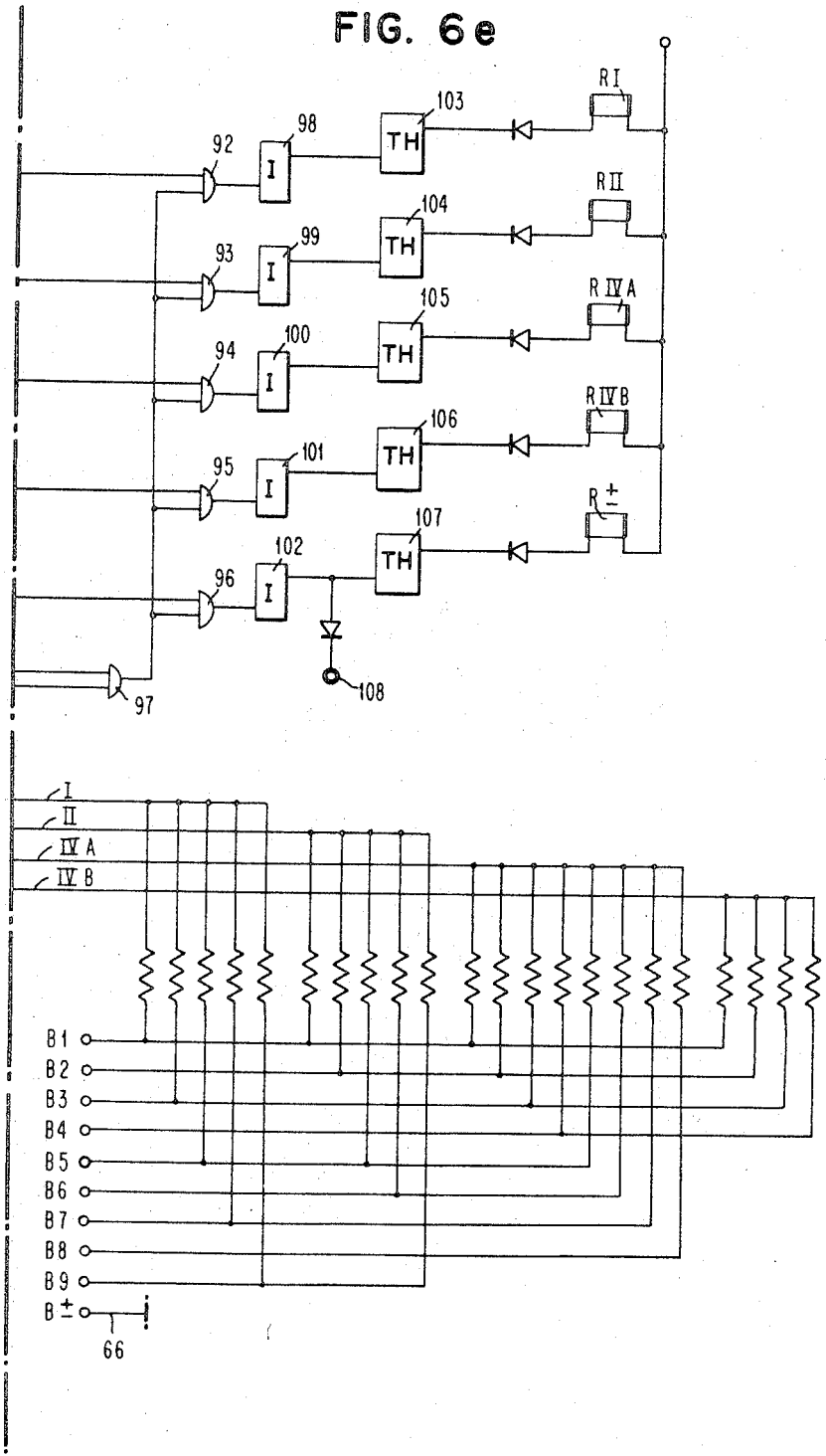

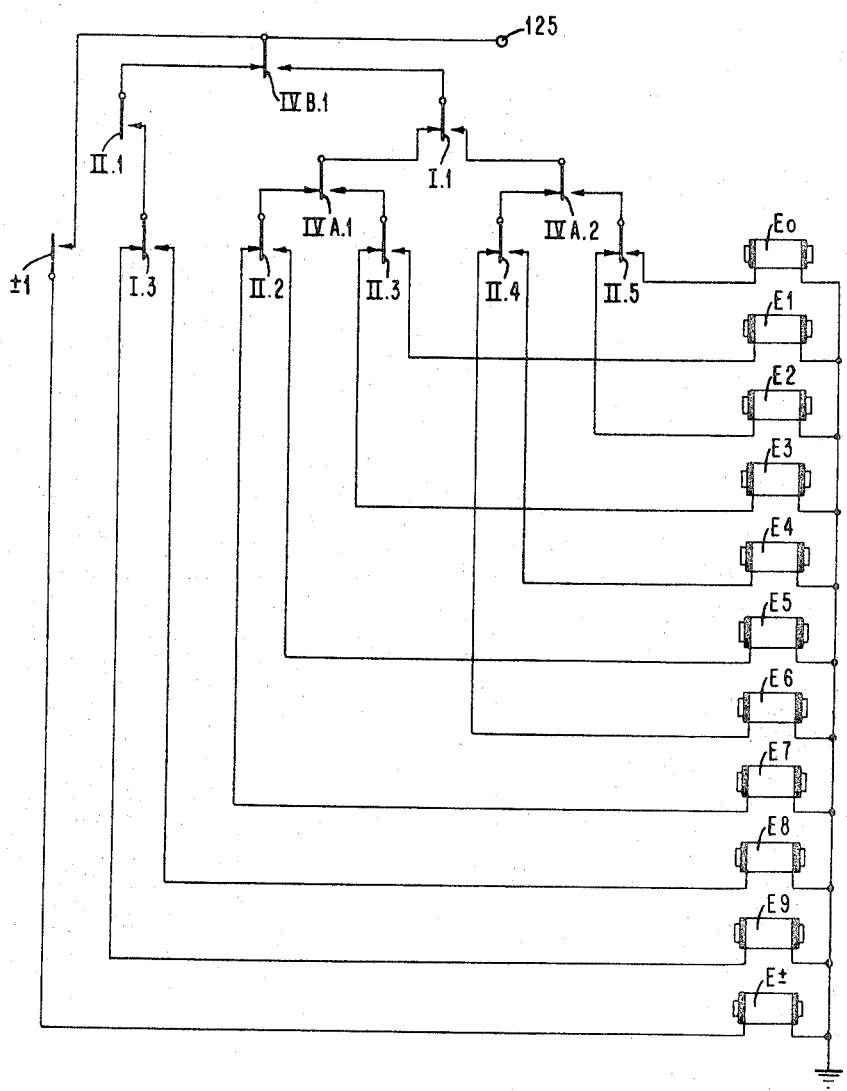

FIG. 7 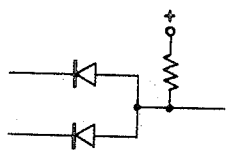 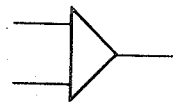 FIG.7a
FIG. 8 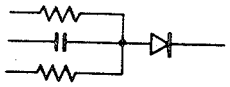 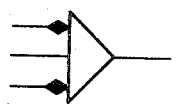 FIG.8a
FIG. 9 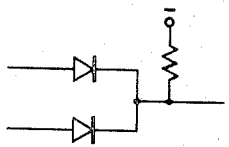 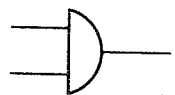 FIG.9a
FIG.10 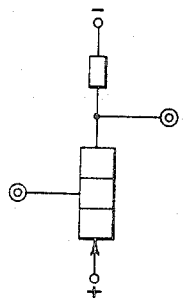 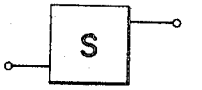 FIG.10a
FIG.11 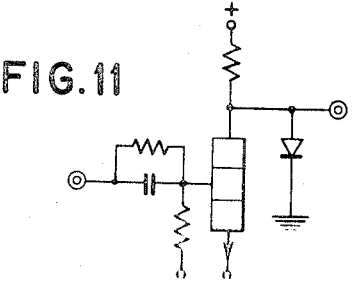 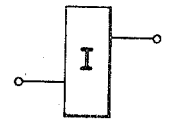 FIG.11a Aug. 22, 1967 L. R. HARPER 3,337,861
DATA TRANSFER DEVICE
Original Filed May 27, 1958 17 Sheets-Sheet 17
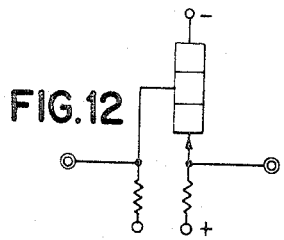
FIG.12
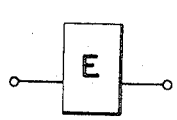
FIG.12a
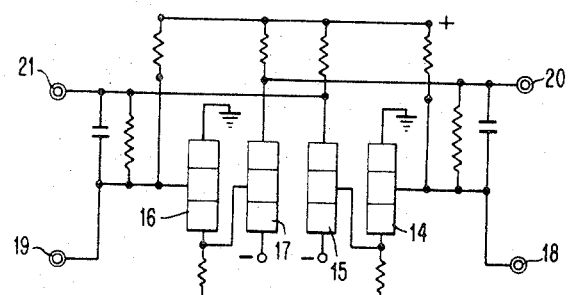
FIG.13
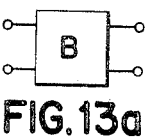
FIG.13a
FIG.13b
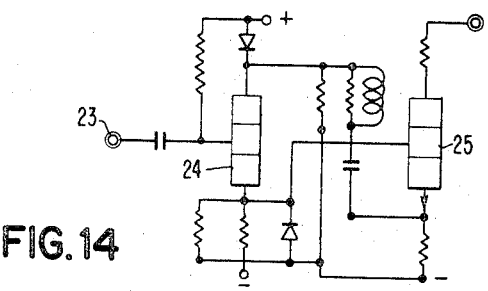
FIG.14
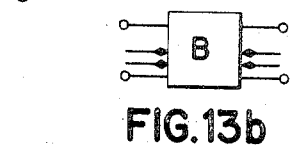
FIG.14a
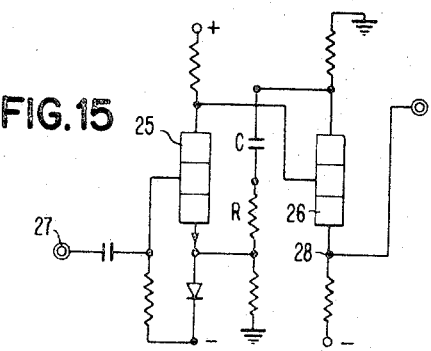
FIG.15
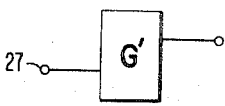
FIG.15a United States Patent Office 3,337,861
Patented Aug. 22, 1967

3,337,861
DATA TRANSFER DEVICE
Leonard R. Harper, Poughkeepsie, N.Y., assignor to International Business Machines Corporation, New York, N.Y., a corporation of New York
Original application May 27, 1958, Ser. No. 738,199, now Patent No. 3,132,245, dated May 5, 1964. Divided and this application Dec. 29, 1961, Ser. No. 164,644
13 Claims. (Cl. 340—347)

This application is a division of copending application Ser. No. 738,199 filed May 27, 1958, and now Patent No. 3,132,245 issued May 5, 1964.

This invention relates to a data transfer device and more particularly to the transfer of data between statistical cards and a storage device.

In calculating machines used in accounting work in which there is a limited number of operations to be performed, it is more important, rather than increasing the calculation speed, that the electronic circuits be simple and the components be sturdy to ensure a durable operation. It is quite obvious that the numeration system which best meets such conditions, is the binary system. However, data read from or recorded in statistical cards is generally coded in the decimal system. Consequently, decimal to binary encoding is required before data may be entered into the storage device while binary to decimal decoding is required after data is extracted from the storage device.

Accordingly, it is an object of the present invention to provide an improved data transfer device.

Another object of the invention is to convert a number expressed in one radix to another radix.

Still another object of the invention is to convert the orders of a decimal number to binary equivalents.

A further object of the invention is to convert the decimal digit values of the orders of a decimal number to their binary equivalents.

Another object of the invention is to convert a decimal number to a binary equivalent.

Still another object of the invention is to derive from the binary equivalent of a decimal number the digit values of the decimal orders in a 1244 code.

A further object of the invention is to convert a 1224 coded digit value to decimal code.

Another object of the invention is to convert a binary number to a decimal equivalent.

Still another object of the invention is to provide a novel selection matrix.

A further object of the invention is to provide a novel arrangement for a magnetic core memory.

Other objects of the invention will be pointed out in the following description and claims and illustrated in the accompanying drawings, which disclose, by way of example, the principle of the invention and the best mode, which has been contemplated, of applying that principle.

FIGS. 4 and 5a to 5h give an explanation of the scanning system of the storage and decimal to binary encoder.

FIGS. 6a to 6j, assembled together as shown by FIG. 6, represents the general diagram of the data transfer device.

FIGS. 7 to 15 represent the elementary circuits used in the device and their conventional representation in the general block diagram.

FIG. 16 is a timing diagram showing various signals of a counter of the device.

General operation

Figure 1:
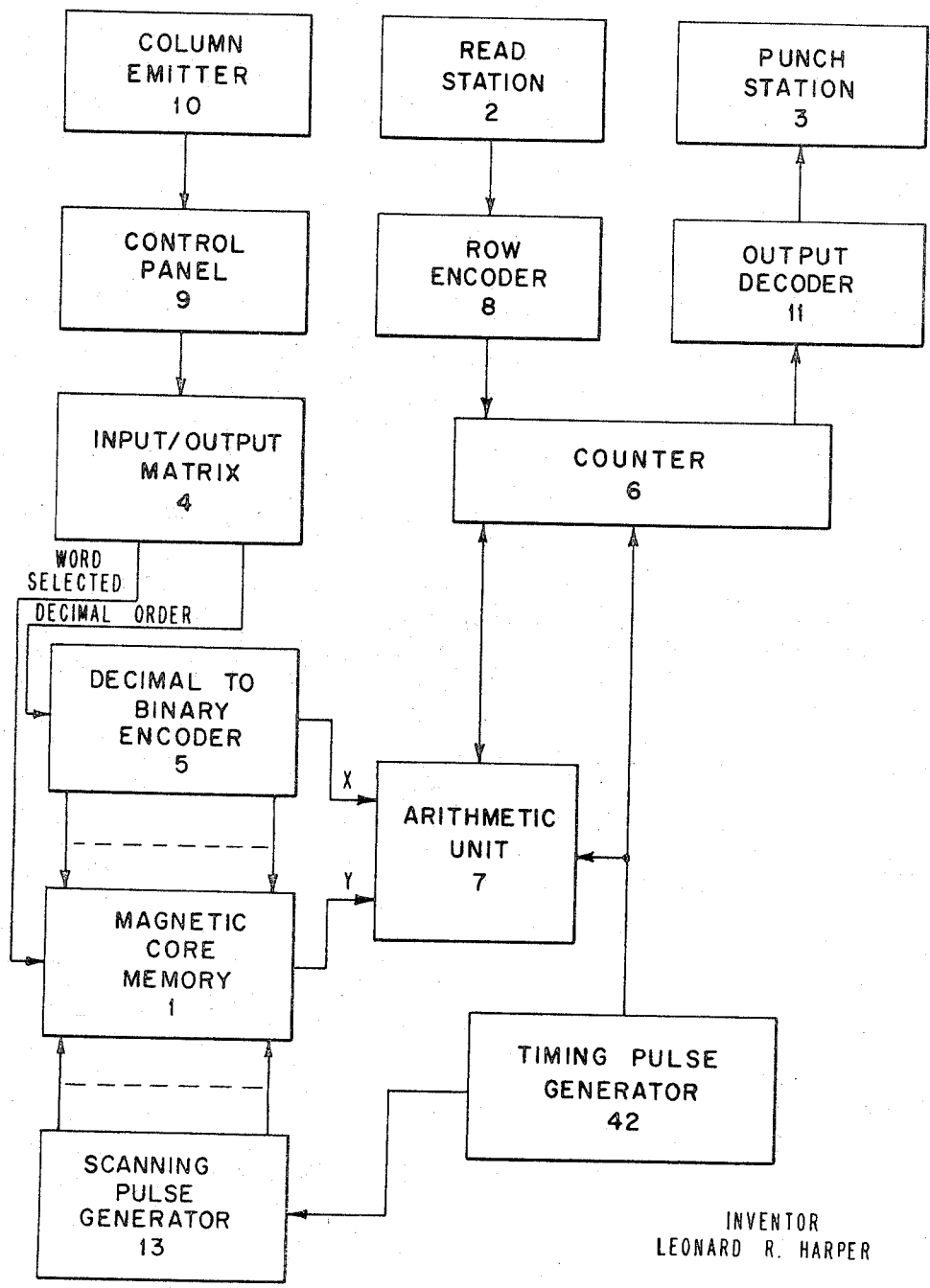
FIG. 1 is a block diagram of the data transfer device of the present invention.

Referring to FIG. 1, the purpose of the recording or read in operation is to transfer binary coded data, which was read in decimal form by the read brushes at the read station 2 of a card reader, into magnetic core storage 1, while the purpose of the read out operation is to transfer decimal coded data, which was read from the magnetic core storage 1 in binary form, to the punch station 3 of a card punch.

These operations are performed under control of the input/output matrix 4, magnetic core decimal to binary encoder 5, counter 6 and arithmetic unit 7. Encoder 5 contains the binary equivalent of the various decimal orders. When in a column of a card the digit $n$ is read from a particular row, the pulse received on the read brush corresponding to that particular row positions binary counter 6 through row encoder 8.

Under the control of counter 6, arithmetic unit 7 adds $n$ times in the storage the binary equivalent of the decimal order corresponding to digit $n$. Thus, for example, if the decimal digit 7 were sensed in the column corresponding to the hundreds order, then, the binary equivalent of $10^2$, namely, 1100100 would be added into storage 7 times resulting in the value, 1010111100, which is the binary equivalent of the decimal number 700. The identification of the order to be affected to number $n$ is performed through input/output matrix 4 and column emitter 10, through control panel 9. The column emitter 10 supplies pulses, available on the control panel at a rate of one per column of the card, to the input/output matrix 4 which is arranged in such a way that the matrix supplies on one output group, pulses corresponding to the various decimal orders, i.e. $10^8$, $10^7$ ... $10^0$, and on the other output group, pulses corresponding to the words, i.e. W1, W2 ... W16. Each order pulse conditions the switch of the corresponding magnetic core line of the encoder 5 while each word pulse conditions the switch of the magnetic core storage location in which the word is to be written or from which the word is to be read in order to allow the addition or the subtraction in the desired word of the number contained in this line of the encoder 5.

The read out operation is performed in a manner whereby the machine subtracts successively, from the word written in a line of the storage, the binary equivalent of the 10 powers in decreasing order. Binary counter 6 records the number of subtractions that it was possible to perform. The indication of counter 6 at the end of the operation is changed into a decimal by relay decoder 11 which ensures the picking up of punch electro magnets at the punch station 3.

During this read out operation, the input/output matrix 4 and the column emitter 10 perform the same duty as during the recording operation. Thus, the pulses corresponding to the columns into which the word is to be punched are sent, through the control panel 9, to the input/output matrix 4. The pulses received on the word outputs condition the line switch of the storage location which contains the word to be punched while the order pulses condition the line switches of the encoder 5, in which the equivalents of these orders are written in binary, in order to allow the subtraction of the content of the encoder line from the storage word.

Figure 3:
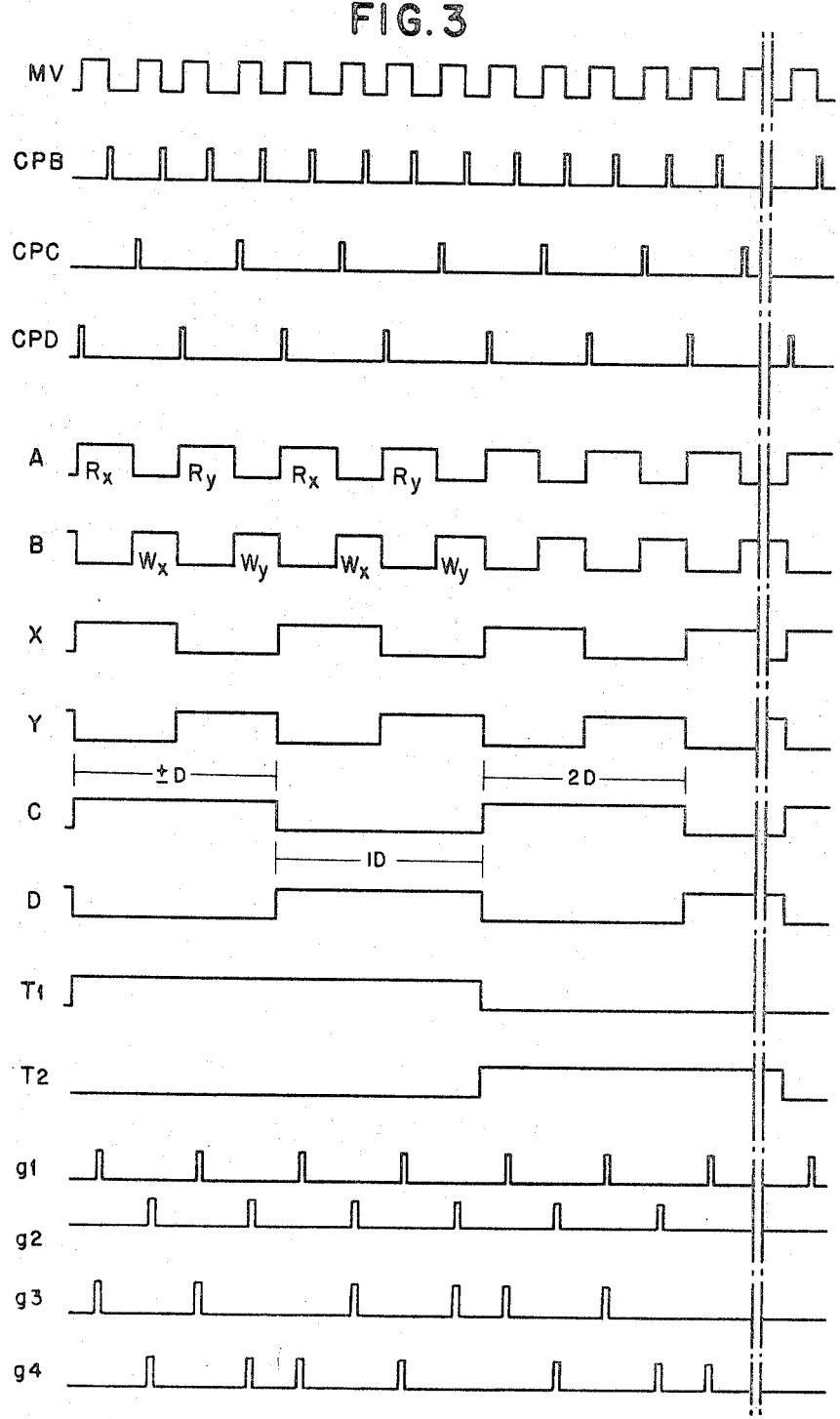
FIG. 3 is a timing diagram showing the signals appearing at various points of the system.

Scanning pulse generator 13 is a common generator for both the storage 1 and the encoder 5 while the timing pulse generator 42 provides the pulses which are necessary at the various times illustrated in FIG. 3.

Decimal-binary encoding

Figure 2:
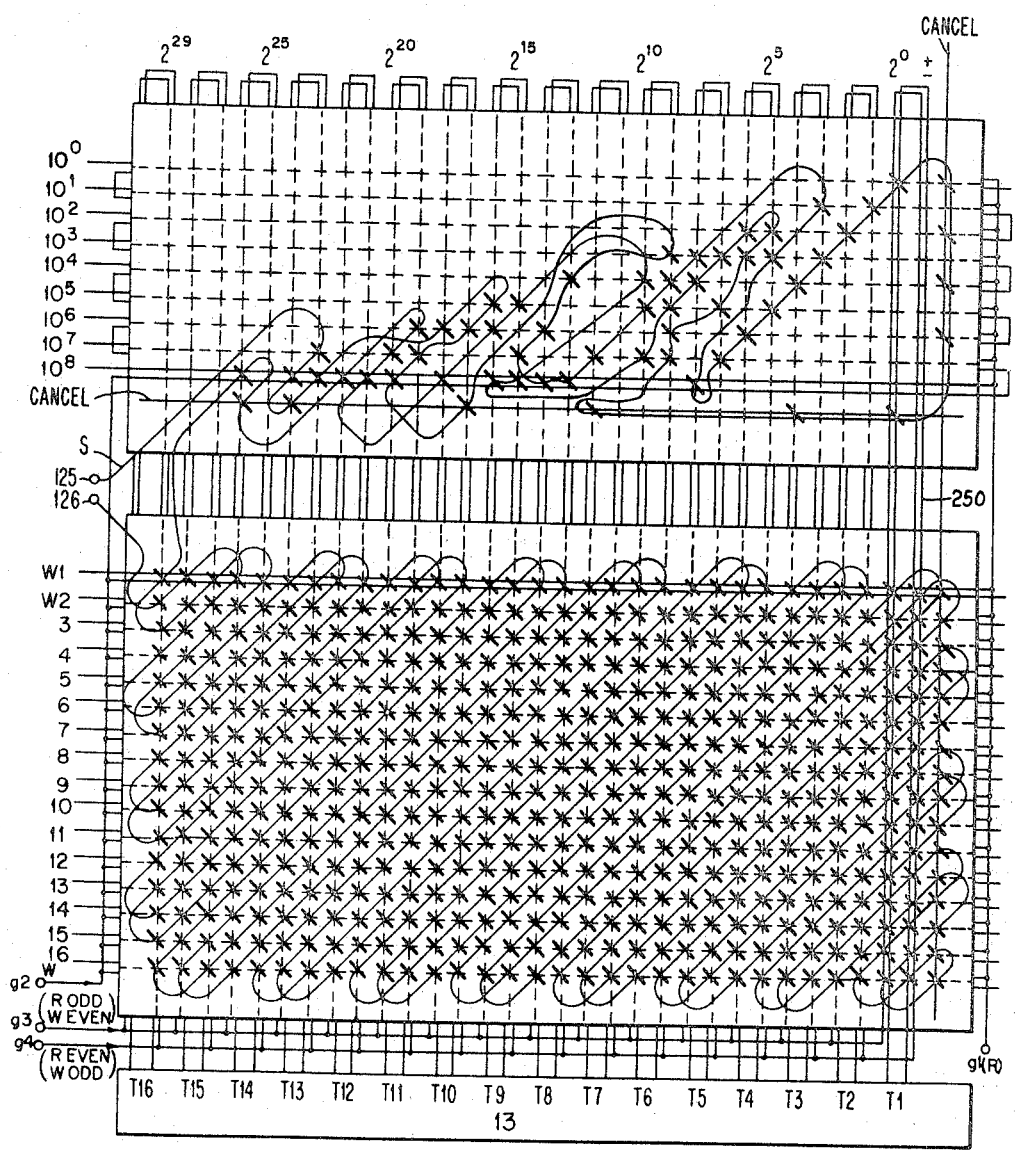
FIG. 2 illustrates the magnetic core storage and the decimal to binary encoder.

Referring to FIG. 2, storage 1 consists of a magnetic core matrix in which the recording is performed through the coincidence of column and row half-currents. In the machine, a word stored in storage 1 will be referred to as word Y while a word stored in the encoder 5 will be referred to as word X. In a writing operation word X, which is in the encoder 5 serves as the addend while word Y which is addressed by the input/output matrix 4 serves as the augend, the sum word being written into the storage position in which word Y is stored.

The timing of the operations of the machine is such that a bit of word X is read, stored in the arithmetic unit 7 and regenerated, after which, the corresponding bit of word Y is read and added to the bit of word X in the arithmetic unit 7, the resultant bit being written back into bit position Y. To this end, the machine timing system supplies the pulses shown in FIG. 3. A multivibrator (not shown) supplies the base signals indicated by MV and starting from these signals, the timing circuits in the timing pulse generator 42 supply pulses CPB, CPC, CPD, A, B, X, Y, C, D, T1, T2, etc.

The time interval during which oscillation A is at a high level is a time during which a bit of word X or word Y is read out of encoder 5 or storage 1, respectively, and applied to the arithmetic unit 7; it will be referred to as read time or time A. Also, the time interval during which oscillaton B is at a high level is the one during which a bit of information is regenerated in a word X position of the encoder 5 or a bit of information from the arithmetic unit 7 is written in a word Y position of storage 1. Identification is the same for times X and Y during which bits of information, respectively, concerning words X and Y, are read and written, that is, time A is the time when a bit of information is read from a word X or word Y position and time B is the time when a bit of information is written into a corresponding word X or word Y position, respectively. Times C and D correspond to the reading and the writing of the cores of the successive columns of the matrix and encoder. Designations 1D, 3D, 5D, etc. . . 31D will be given to the successive times during which the level of pulses D is high, and ±D, 2D, 4D etc. . . . 30D to the successive times during which the level of pulses C is high. The timing generator also supplies pulses existing only during one of the times or even during a portion of one of these times during which pulse X or Y is at a high level.

In addition to these pulses, a chain of triggers forming a ring counter of the type defined in the Proceedings of the IRE; volume 44; No. 9; September 1956; page 1169, in the timing pulse generator 42 supplies under the control of the main multivibrator, 16 pulses T1, T2 . . . T16, only T1 and T2 of which are shown on the diagram. To these basic pulses and times, have been added in g1, g2, g3, g4 the combinations which have been made with them for operating the matrix 1 and the encoder 5 which are now to be considered.

Referring now to FIG. 2, the storage 1 consists of a 16-row and 32-column magnetic core matrix in which information is recorded at a rate of one word per row, while the encoder 5 consists of 32 columns, corresponding to those of the storage 1, and 10 rows having magnetic cores located at predetermined positions. Nine of the ten rows of the encoder 5 correspond to successive powers (0 through 8) of 10 while 30 of the 32 columns correspond to succesive powers (0 through 29) of 2. The 10th row of the encoder 5 and the 32nd column of both the storage 1 and encoder 5 consist of a cancel line having cores placed thereon corresponding to each row of the storage 1 and predetermined rows and columns of the encoder 5. The cores are arranged in the encoder 5 in such a way that it is possible to read out on the columns the binary equivalent of the 10 powers read in on the rows. Thus, in row $10^2$, there are cores in the 2nd, 5th and 6th columns ($10^2 = 2^6 + 2^5 + 2^2 = 1100100$). The encoder 5 cores permanently contain "1" bit representation. Each core of storage 1 except those on the cancel column is threaded by a column read wire, a column write wire, a row read wire, a row write wire and a sense wire while the cores on the cancel wire are threaded by the sense wire and the row wire and are provided to minimize the effects of half select current pulses induced on the sense wire S. The sense wire S is wound through the matrix in checkerboard fashion to also minimize noise (due to half select current pulses) inducted on the sense wire S. Thus, due to the addition of the cancel core in each row of the storage 1, the sense wire S passes through 16 of the cores in each row in one sense and the remaining 16 cores in the opposite sense. Hence, when a half select current pulse is applied to a selected row and column of the storage 1, one of the cores on the selected row is selected or switched while the remaining 31 cores are half selected. The magnetic effect due to half selection of 16 of the cores is virtually cancelled by the opposite magnetic effect due to the half selection of the remaining 15 cores of the selected row.

It will be noted that a column drive line as for example, line 250 goes up through 16 cores of the storage 1 and a predetermined number in the encoder 5 and then down through a predetermined number in encoder 5 and 16 cores of the storage 1. A core is provided on the cancel row so that the drive line will pass through an even number of cores and the sense wire S is wound through the cores of the encoder 5 in such a manner as to minimize the noise induced on the sense wire S due to the half selection current pulse on a column drive line. Similarly cores are provided at predetermined points on the vertical cancel line in the encoder 5 and due to the direction in which the sense wire passes through the cores of a row of the encoder 5 noise induced in the sense wire S due to the half selection current pulse on a row drive line is minimized.

In order to enter into storage 1, assuming it to be cleared, in binary a number read in decimal, as for example, the number 300, the switch of line $10^2$ of the encoder 5 is first closed and, through the scanning circuits 13, the first bit position of line $10^2$ is scanned and its value is stored in the arithmetic unit 7. Then, the switch of a selected line in storage 1 is closed and the corresponding bit position of the selected line is scanned and its value (0) is added to the bit from the corresponding position of the line $10^2$ in the encoder 5 in the arithmetic unit 7 and the resultant bit is stored in the same bit position of the selected line.

Through scanning circuits 13 of storage 1 and encoder 5, and through the arithmetic unit 7, the corresponding bits are added, column after column, starting with the lowest power of 2, so that at the end of the machine cycle, the content of line $10^2$ of the encoder 5 is stored in the selected line of the storage 1. Since in row $10^2$ of the encoder 5, there are cores only in columns $2^6$, $2^5$ and $2^2$, the storage, at the end of the operation actually contains the binary equivalent of 100. Through performing this operation three times, the binary equivalent of 300 will have been written. In order to read out a word from the storage, the process is similar, the arithmetic unit instructing to subtract, binary element after binary element, the content of a line of the decoder of a storage word.

*Storage scanning*

Refer now to FIGS. 4 and 5 in order to see how the scanning system of storage 1 and encoder 5a–5h operates. FIGS. 4 and 5 show only four magnetic cores for purposes of explanation, two of which (cores A and C) may belong to the word addressed on time X, or word X, and the other two (cores B and D) belong to word Y. The wires proceeding from pulse generators G3 and G4 twice cross, not two rows of cores, but the 16 rows of the storage and the 9 rows of the encoder 5, each wire going one way through a column, and the following or the preceding one in the other way. The generators are operative only when the corresponding switches are closed. In the present case, switches S4 and S5 are closed on times X, switches S4' and S5' on times Y, switches S1 and S2 on one of times T1, T2, etc. . . . or T16 (see time table). It should be noted that if cores A and C belong to a line of encoder 5 and cores B and D to a line of the storage 1, switches S4 and S5 are closed by the order pulses and switches S4' and S5' by the word pulses of the input/output matrix 4. It will be assumed that the currents travel from the pulse generators to ground.

FIG. 3 shows the current pulses g1, g2, g3 and g4, respectively supplied by pulse generators G1, G2, G3, G4, and in FIGS. 5a to 5h the state of the magnetization currents of cores A, B, C, D of FIG. 4 during the 8 successive periods of the basic multivibrator in which switches S1 and S2 will be closed, i.e. during time T1 of the primary chain if the first two columns of the matrix and encoder are concerned. The diagrams and figures show that the binary information are successively read and written cores A, B, C, D. Thus, referring to FIGS. 3, 4 and 5a, during read time (A time) of word X, switches S1, S2, S4 and S5 are closed and half select current pulses are applied from generators G1 and G3. Core A is switched since the half select current pulses pass in the same direction through the core. No effect is sensed in core C since the half select current pulses from generators G1 and G3 pass in the opposite sense through the core C. Cores B and D are half selected due to the half select current pulse from generator G3. However, they are half selected in opposite senses so that no noise would appear on the sense wire.

Now, referring to FIG. 5b, during write time (B time) of word X, switches S1, S2, S4 and S5 remain closed and half select current pulses are applied from generators G2 and G4. Core A is switched since the half select current pulses pass in the same direction (opposite to that during read time) through the core. Again, no effect is sensed in core C since the half select current pulses from generators G2 and G4 pass in opposite sense through core C. Also, again, cores B and D are half selected due to the half select current pulse from generator G4.

Now, referring to FIG. 5c, during read time (A time) of word Y, switches S1 and S2 remain closed, S4 and S5 are opened and S4' and S5' are closed and half select current pulses are applied from generators G1 and G3. Core B is switched since the half select current pulses pass in the same direction through the core. No effect is sensed in core D since the half select current pulses from generators G1 and G3 pass in opposite sense through the core D. Cores A and C are half selected due to the half select current pulse from generator G3. However, they are half selected in the opposite sense so that no noise would appear on the sense wire.

Now, referring to FIG. 5d, during write time (B time) of word Y, switches S1, S2, S4' and S5' remain closed and half select current pulses are applied from generators G2 and G4 only if it is desired to write a 1 bit in this core. Core B is switched since the half select current pulses pass in the same direction (opposite to that during read time) through the core. Again, no effect is sensed in core D since the half select current pulses from generators G2 and G4 pass in opposite sense through core D. Also, again, cores A and C are half selected due to the half select current pulse from generator G4.

Now, referring to FIG. 5e, during read time (A time) of word X, switches S1 and S2 remain closed, S4' and S5' are opened and S4 and S5 are closed and half select current pulses are applied from generators G1 and G4. Hence, in a manner similar to that previously described, only core C is switched. Following this, half select current pulses are applied from generators G2 and G3 to switch core C back to its original state as shown in FIG. 5f. Similarly, core D is switched from one state to the other and then back as shown in FIGS. 5g and 5h.

It should be noted that generator G1 always operates as a read driver while generator G2 always operates as a write driver. Also, generators G3 and G4 alternate as a read and write driver. Thus, generator G3 operates as a read driver for odd columns and as a write driver for even columns whereas generator G4 operates as a write driver for odd columns and as a read driver for even columns. Such an arrangement avoids the requirement of a current pulse generator for each column.

These operations are repeated according to the same sequence for the other columns of the matrix during times T2 . . . T16, thus allowing the scanning of the 32 columns of the matrix and encoder.

Basic circuits

Before undertaking the general description of the present invention with the data transfer device as a whole, the basic circuits and their conventional representation will be described, the latter bearing the figure number of the corresponding circuit, with symbol a.

FIG. 7 shows a diode AND circuit with two inputs; FIG. 8 shows a capacitance resistor diode gate and FIG. 9 shows a diode OR circuit with two inputs.

FIG. 10 represents a switch including a PNP transistor with input through the base and output through the collector.

FIG. 11 shows an inverter comprising a capacitance resistor input, a NPN transistor and an output on the collector resistor with a diode preventing the collector potential from exceeding that of the ground. Also, the terminal connected to the emitter may be used as a control terminal.

FIG. 12 represents an emitter follower comprising a PNP transistor having an output on the emitter resistor.

FIG. 13 shows a trigger having 4 PNP transistors 14, 15, 16, 17 in which the collectors of transistors 14 and 16 are respectively connected to the bases of transistors 16 and 14 through transistors 15 and 17 wired as emitter follower. The inputs are made through terminals 18 and 19 and the outputs through terminals 20 and 21, the reset of the trigger through terminal 20. Each input may comprise one or more diode gates having a resistor and capacitance similar to that represented in FIG. 8. FIG. 13b represents a trigger of the preceding type the input of which comprises a diode gate indicated by a small diamond. It should be kept in mind that the trigger is reset when the level of its right output is low and that it is ON when the level of its right output is high. When only one diamond is shown at the side of the trigger it is implied that the other control terminal of the diode gate is internally connected to the emitter of the associated emitter follower.

FIG. 14 represents the diagram of pulse generator for reading and recording information from the magnetic core matrix. This device is controlled by timing pulses sent to input 23. It comprises a PNP transistor 24 picked up at the base. The potential variations of the collector are applied to a NPN transistor 25 the load of which is split between the emitter and the collector, the emitter voltage being applied through a capacitance and a series resistor to the emitter of transistor 24. This connection results in extending the action of the pulse applied in 23 to transistor 24, the circuit operating in single shot.

FIG. 15 represents a pulse generator or more particularly a monostable comprising 2 additional transistors 25 and 26. Assume that 25 is NPN and 26 PNP. When a positive pulse is sent to input 27, transistor 25 is saturated, its collector potential decreases, thus bringing to saturation transistor 26. The emitter potential of the latter is transmitted to the emitter of transistor 25 through a resistor and a capacitance. Capacitance C unloads in the circuit made up of resistor R, transistor 25 and the base emitter junction of transistor 26. When the discharge current is no longer sufficient to saturate transistor 26, the potential of its emitter increases, thus blocking transistor 25 and allowing the return of the reset conditions.

Referring now to FIG. 6 which includes 10 drawings 6a to 6j representing the device as a whole.

Input/output matrix

Figure 6A:
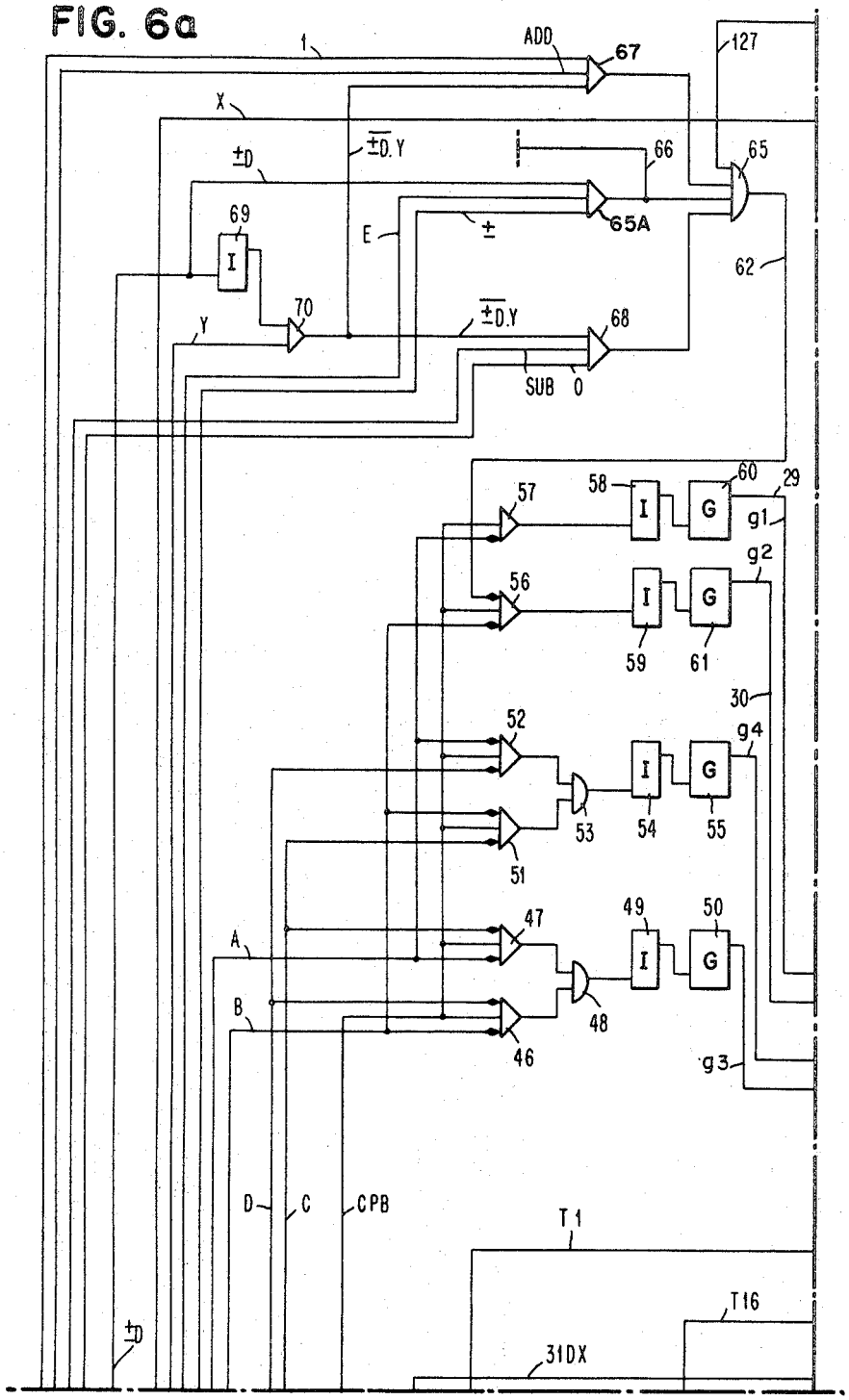
Figure 6D:
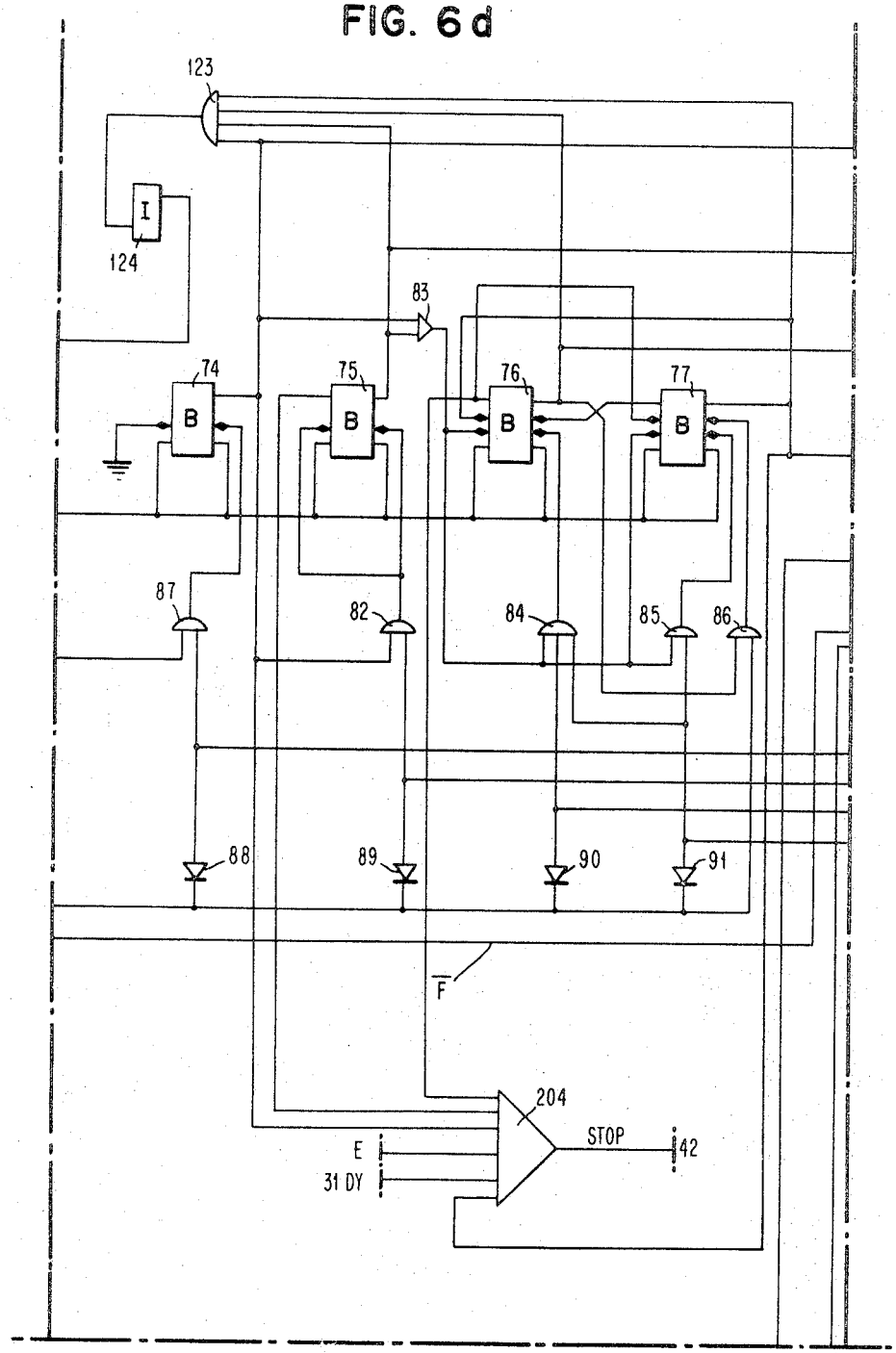
Figure 6F:
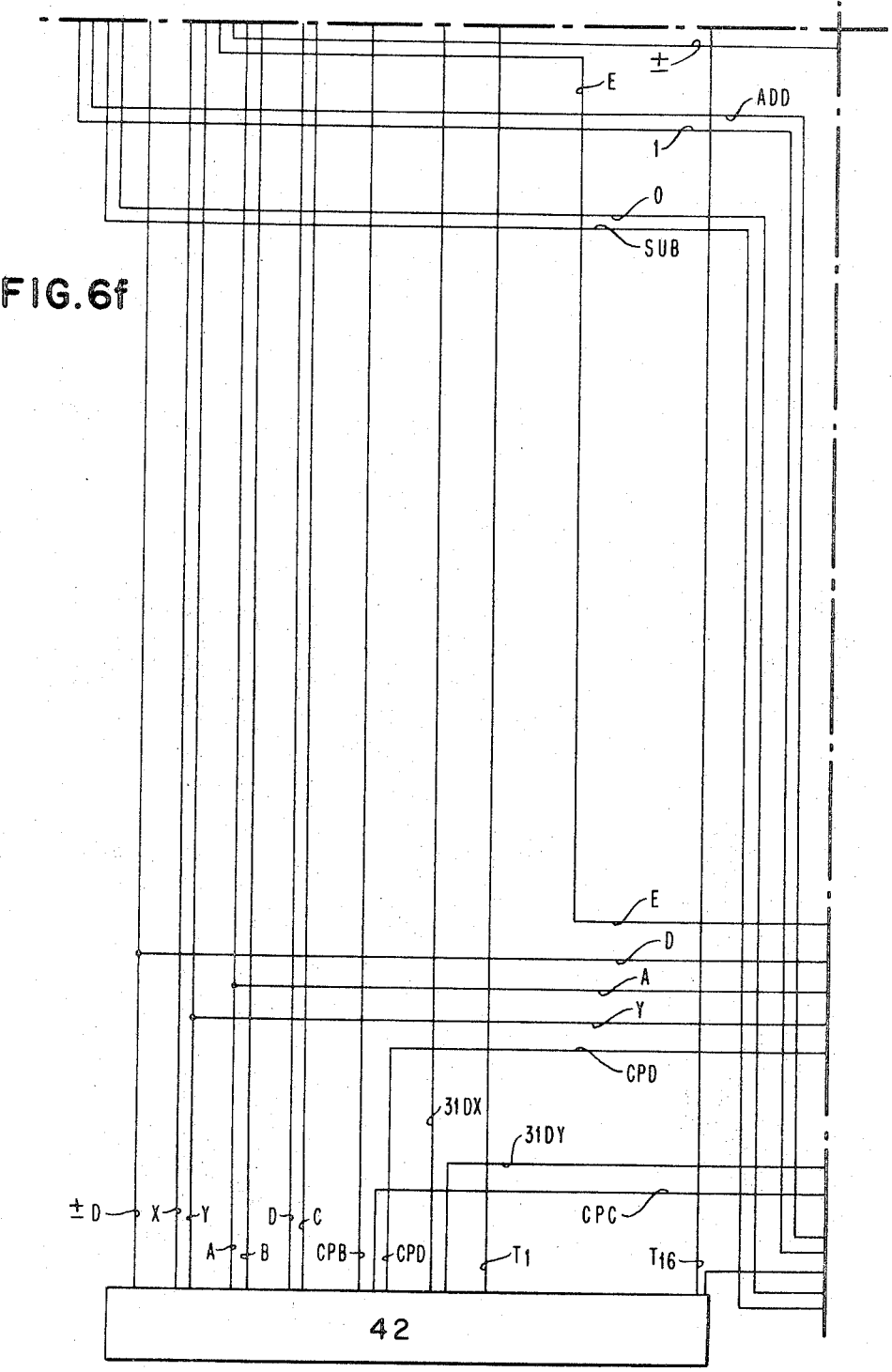
Figure 6G:
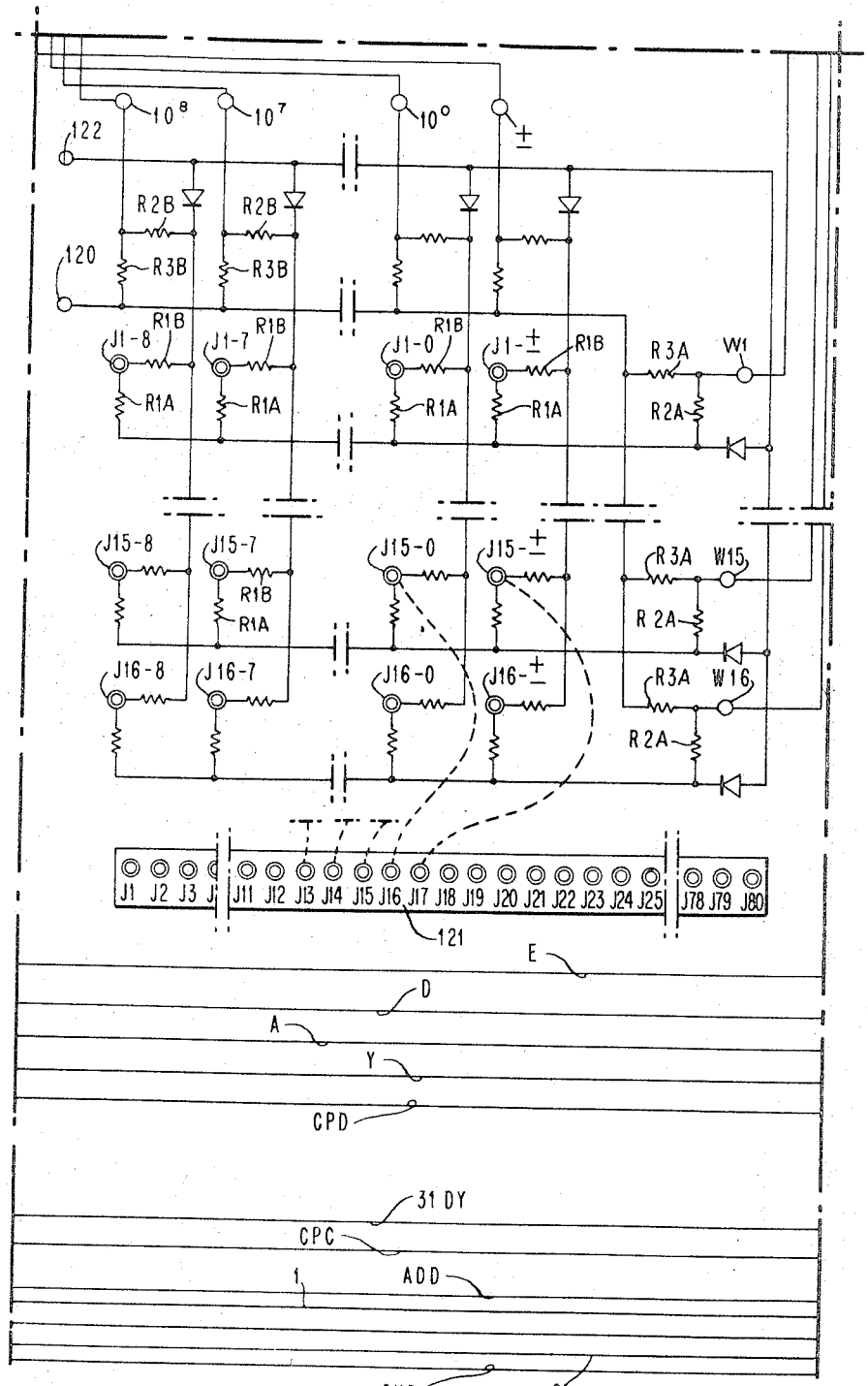

Refer first to FIG. 6g which shows the input/output matrix 4. It comprises 160 input hubs J1±, J1-0, J1-0 . . . J16-7, J16-8 appearing in the control panel 9 distributed among 16 rows of 10 columns, and 26 output terminals; 16 correspond to the rows, 10 correspond to the columns. The figure shows only the hubs common to row lines W1, W15, W16, cf. FIG. 6b, and to column lines ±, $10^0$, $10^7$, $10^8$, cf. FIG. 6b. Each hub of the matrix is connected to a voltage supply 120 through two parallel channels each comprising resistors R1, R2, R3. Thus, for example, hub J1-8 is connected via a channel comprising R1A, R2A and R3A and via a parallel channel R1B, R2B and R3B to the voltage supply 120. Connected to the junction spots of resistors R2A and R3A of a channel, are the row output terminals W1, W2 . . . W16, FIG. 6g, and to the junction spots of the corresponding resistors R2B and R3B of the other channel, the column output terminals $10^8$, $10^7$ . . . $10^0$, ±, FIG. 6g.

The junctions of resistors R1 and R2 are diode coupled to a negative voltage supply 122 while the other end of resistors R3 is connected to a negative voltage supply 120 which is more negative than that of supply 122. Consequently, since the anode of the diodes is connected to voltage supply 122 and the cathode of the diodes is coupled via resistors R2 and R3 to the more negative voltage supply 120, current will flow from voltage supply 120 via resistors R3, R2 and the respective diodes to voltage supply 122. Hence the output terminals of the matrix connected to the junctions of resistors R2 and R3 will be at a relatively negative potential to decondition the switching circuits associated with the storage 1 and encoder 5.

Now, assume that a relatively positive potential is applied to the hub J15-7. Under this condition, the cathode of the diodes associated with the column and the row which includes this hub is placed at a more positive potential than their anode and these diodes will be cut off. Consequently, current will flow from voltage supply 120 through resistors R3B, R2B and R1B in the associated column, to the hub J15-7 and, in parallel, from voltage supply 120 through resistors R3A, R2A and R1A in the associated row, to the hub J15-7. Hence, the potential at the output terminals W15 and $10^7$ will be raised to a relatively positive value to operate the switching circuits associated with word 15 in storage 1 and order $10^7$ in encoder 5. There are fifteen other paths, corresponding to the rows of the matrix, leading to the selected hub and nine other paths, corresponding to the columns of the matrix leading to the selected hub. The current flowing in these paths are relatively small and are such that the associated diodes are not cut off with the resulting effect being that the corresponding output terminals are maintained at relatively negative potentials.

In order to understand well how the input/output matrix 4 performs its selection function, assume that a 6 digit number located in columns 11 to 16 of the punched card is to be entered in (or read out of) the storage 1. Consequently, with the 6 hubs J11 . . . J16 of the control panel 9, successive pulses are available, supplied by column emitter 121, when columns 11 to 16 of the punched card pass under the read brushes.

Assuming that in the card, the unit digit is punched in column 16, the tens digit in column 15, etc. . . . and that it is desired, to record the punched word in word position 15 of storage 1, the operator respectively wires together hubs J16 and J15-0, J15 and J15-1, J14 and J15-2, etc. . . . Thus, when column 14 of the punched card passes under the read brushes, a pulse will be applied to hub 15-2, causing the appearance of two pulses on output terminals W15 and $10^2$. These pulses respectively close the switch of word 15 of storage 1 and that of the line of the magnetic core encorder 5 which contains the binary equivalent of $10^2$. This allows the addition of the content of line $10^2$ of the encoder 5 to be realized in word 15 of storage 1. The addition is performed a number of times equal to the digit read in column 14 of the punched card as will be explained hereinafter with respect to the counter 6 and row encoder 8.

A column of the input matrix is reserved to signs ± It is used as a means for the recording or the read out of the sign. A column of the punched card is used to represent the sign of a number. In the preceding example, the pulse of the column of the punched card which contains sign, J17 for instance, would be sent to hub J15-±, of the input/output matrix 4. The pulse received on output terminal W15 will close the switch of word 15 of the storage 1 as previously. The pulse received on the terminal of column ± is used in a special circuit for entering the sign in the storage which will be described hereinafter.

Pick up system of the storage and the encoder

Refer now to FIG. 6b which represents a part of the encoder 5, the storage 1 and their horizontal and vertical pick up system. The picking up of the column wires is systematically done by the successive scanning of the 32 columns, the picking up of the row lines is done only for two words; one from the encoder 5 is addressed on time X, the other from storage 1 is addressed on time Y.

The figure shows the words corresponding to orders $10^0$, $10^7$, $10^8$ of the encoder 5 and words W1 . . . W15 and W16 of storage 1, this for the first two and the last two columns. The rows are picked from the input/output matrix 4 through a voltage which operates on an inverter.

Each line inverter of storage 1 supplies power to two switches, one for reading the word, the other for writing. All the word reading switches receive, through wire 29, pulses g1 represented on the time table, and the word writing switches receive pulses g2 through wire 30.

Each line inverter of the encoder 5 supplies power to only one reading switch which also receives pulses g1, and there is for the encoder 5 a single writing switch 32 the output wire of which goes through all the decoder cores so that, after each reading operation, the binary information is automatically regenerated in the encoder 5.

At X time, a positive and negative signal is maintained on lines 34 and 33, respectively, which lines are connected to the control inputs (the emitter of the inverter transistor) of the row inverters associated with the storage 1 and encoder 5 respectively. Consequently, at X time, the positive signal on line 34 deconditions the row inverters associated with storage 1 while the negative signal on line 33 conditions the row inverters associated with encoder 5.

At Y time, a negative and positive signal is maintained on lines 34 and 33 respectively, to condition the row inverters associated with storage 1 and to decondition the row inverters associated with encoder 5. The purpose of this is to respectively address, on times X and Y, the words from the encoder 5 and storage 1 selected by the input matrix.

The picking up of the columns is common to the storage 1 and encoder 5; it is performed by pair for two-columns. Each column inverter supplies power to two switches, the output wires of which goes one way through a column, and the other way in the column associated to the first one. Inverters 37 and 38 respectively receive pulses T1 and T16 (only T1 appears in FIG. 3). Switches 45 and 39 receive pulses g3 and switches 40 and 41, pulses g4. Operation of this scanning system has been described with more details in relation to FIGS. 4 and 5.

FIG. 6f shows the timing pulse generator 42 and FIG. 6a the circuits allowing to realize sequences g1, g2, g3, and g4. Pulses CPB, B, D are applied to AND circuit 46, pulses A, C, CPB to AND circuit 47, the outputs of which are applied to the OR circuit 48. The output of the OR circuit 48 is applied via the inverter 49 to the pulse generator 50.

Pulses CPB, B and C are applied to AND circuit 51 while pulses CPB, A and D are applied to AND circuit 52, the outputs of which are applied to the OR circuit 53. The output of the OR circuit 53 is applied via the inverter 54 to the pulse generator 55.

Pulses CPB, B and one from the OR circuit 65, via line 62, corresponding to a write control, are applied to AND circuit 5, the output of which is applied via inverter 59 to the pulse generator 61.

Pulses CPB and A are applied to AND circuit 57, the output of which is applied via inverter 58 to the pulse generator 60.

Referring now to FIG. 3 together with 6a, it will be noted that at read time (A time) of the first X time, positive signals appear on lines CPB, A and C causing AND circuit 47 to be rendered effective to apply a positive signal via OR circuit 48 to the inverter 49 where it is inverted to a negative signal to render the pulse generator 50 effective to apply a read drive pulse on linge g3. At the same time, pulses on lines CPB and A cause AND circuit 57 to be rendered effective to apply a positive signal to the inverter 58 where it is inverted to a negative signal to render the pulse generator 60 effective to apply a read drive pulse on line g1.

At write time (B time) of the first X time, positive signals appear on lines CPB, B and C causing AND circuit 51 to be rendered effective to apply a positive signal via OR circuit 53 to the inverter 54 where it is inverted to a negative signal to render the pulse generator 55 effective to apply a write drive pulse on line g4. At the same time, positive signals appear on lines CPB, B and line 62. Whenever a write operation is to be performed in the encoder 5, a positive signal appears on line 127 which passes via the OR circuit 65 and line 62 to the AND circuit 56. These positive signals render the AND circuit 56 effective to apply a positive signal to the inverter 59 where it is inverted to a negative signal to render the pulse generator 61 effective to apply a write drive pulse on line g2.

At read time and write time of the first Y time, similar circuits are rendered effective to apply read drive pulses on lines g3 and g1 and write drive pulses on lines g2 and g4. However, these pulses will be effective in storage 1 whereas previously these drive pulses were effective in the encoder 5. It should be noted that with respect to storage 1 a positive pulse is applied to line 62 only if a "1" bit is to be written whereas with respect to encoder 5 a "1" bit is always written.

At read time (A time) of the second X time, positive signals appear on line CPB, A and D causing AND circuit 52 to be rendered effective to apply a positive signal via OR circuit 53 to the inverter 54 where it is inverted to a negative signal to render the pulse generator 55 effective to apply a read drive pulse on line g4. At the same time, positive pulses on lines CPB and A cause AND circuit 57 to be rendered effective to apply a positive signal to the inverter 58 where it is inverted to a negative signal to render the pulse generator 60 effective to apply a read drive pulse on line g1.

At write time (B time) of the second X time, positive signals appear on lines CPB, B and D causing AND circuit 46 to be rendered effective to apply a positive signal via OR circuit 48 to the inverter 49 where it is inverted to a negative signal to render the pulse generator 50 effective to apply a write drive pulse on line g3. At the same time, pulses on lines CPB, B and line 62 cause AND circuit 56 to be rendered effective to apply a positive signal to the inverter 59 where it is inverted to a negative signal to render the pulse generator 61 effective to apply a write drive pulse on line g2.

At read and write time of the second Y time, read drive pulses are again applied to lines g1 and g4 and write drive pulses are applied to lines g2 and g3 in a similar manner as that described above. It should be noted that a read drive pulse always appears on the line g1 and a write drive pulse always appears on line g2 whereas the functions of lines g3 and g4 alternate, one being the read drive line and the other the write drive line with respect to one column and correspondingly the write drive line of the read drive line for the next successive column.

*Recording and read out control*

FIG. 6c represents the circuits ensuring the recording and read-out controls. Certain words of the storage (words 1 to 10 for instance) are used during the recording, while the others (words 11 to 16) are used during the read out. It is however obvious that, according to the desired use of the machine, another distribution may be adopted. The matrix outputs W1 to W10 are assembled in an OR circuit 42, the output of which becomes, when its level is high, recording control E. In the same manner, read out control F is made up of OR circuit 43, the inputs of which correspond to the word outputs W11 to W16 of the matrix. An inverter 44 provides a $\overline{F}$ signal, the purpose of which will be explained hereinafter with respect to read out. An OR circuit 46 provides an E+F control.

*Write control*

Referring now to FIGS. 6c and 6a, when a writing operation is to be performed in encoder 5, a negative signal is generally applied from inverter 31 (FIG. 6b) to close switch 32. The negative signal is also applied to the inverter 200 where it is inverted to a positive signal and applied via line 127 and OR circuit 65 to the write control line 62.

In order to enter the sign, read from the sign column of a card, an AND circuit 65A receives on its inputs control E, timing pulse ±D and the output wire of column ± of the input/output matrix. Additionally, the resistor portion of the AND circuit 65A and the source to which it is connected are at the read station and the other end of the resistor is connected to the AND circuit 65A shown diagrammatically by line 66. Consequently, when a hole is sensed by the read brush, indicating a — sign, then, positive potential is applied to render the AND circuit 65 effective to apply a positive signal via OR circuit 65A to the write control line 62 so that a "1" bit will be recorded indicative of the — sign. If no hole is sensed, the AND circuit 65A is deconditioned so that a negative signal passes via OR circuit 65 to the write control line so that a "0" bit is effectively recorded indicative of the + sign.

The writing operation, on time Y, is performed through AND circuits 67 and 68 under the control of the arithmetic unit 7. When a sign scanning cycle is not being performed a negative signal is maintained on the ±D line which is inverted to a positive signal by the inverter 69 and applied to one input of the AND circuit 70. The other input to AND circuit 70 is connected to line Y so that a positive signal is produced at the output thereof representing the logical expression $\overline{\pm D} \cdot Y$ which is applied to one input of both of the AND circuits 67 and 68. The AND circuit 67 also receives control ADD and 1 indicating that the machine is in addition (read in operation) and that the result is 1, respectively, while the AND circuit 68 receives controls SUB and 0 indicating that the machine is in subtraction (read out operation) and that the complemented result is 0 (that a 1 may be written), respectively. Hence, whenever the input conditions of either AND circuit 67 or 68 is met, a positive signal is applied via OR circuit 65 to write control line 62.

FIG. 6c also shows the circuits which supply on lines 33 and 34 the pulses which allow an order of the encoder 5 to be selected and block selection of a word in storage 1 at X time and vice versa during Y time.

When a word is to be written into storage 1 a positive signal is applied from the input/output matrix 4 via OR circuit 42 to line E. Likewise, when a word is read out of storage 1 a positive signal is also applied via OR circuit 43 to line F. The positive signal on lines E or F is applied via OR circuit 46 to one input of AND circuit 63. Hence, at X time, when a bit is to be processed at the encoder 5, a positive signal is applied to line X rendering the AND circuit 63 effective to apply a positive signal to inverter 64 where it is inverted to a negative signal to close switch 36 which, in turn, applies a positive signal via line 34 to decondition all of the inverters associated with storage 1 so that, at X time, selection will occur in the encoder 5. However, at Y time, when a bit is to be processed at storage 1, a negative signal is applied via line X to decondition the AND circuit 63 causing a negative signal to be applied to inverter 64 while it is inverted to a positive signal to open switch 36 which, in turn, applies a negative signal to condition all of the inverters associated with storage 1 so that, at Y time, selection will occur in storage 1.

When a word is to be written into storage 1, the counter 6 (shown in FIG. 6d) must be set to the 12 complement of the digit which is to be entered into storage 1. Hence, during the first recording cycle a recording operation is blocked to allow this value to be entered into the counter 6. This is accomplished by the OR circuit 123 sensing that all of the triggers of the counter 6 are off and applying a negative signal to the inverter 124 where it is inverted to a positive signal which is applied to one input of the AND circuit 72. Since this is a recording cycle, a signal on line E renders the AND circuit 72 effective to apply a positive signal to the inverter 73 where it is inverted to a negative signal which is applied to decondition the AND circuit 71. Hence, at X time, the positive signal on line X is ineffective at the AND circuit 71 which therefore causes a negative signal to be applied to close the switch 35, the lower output of which (connected to the emitter thereof) applies a negative signal to the inverter 31 where it is inverted to a positive signal to open switch 32 and thereby effectively open the write drive circuit for the encoder 5. At the same time, a positive signal is applied from the upper output of switch 35 and via line 33 to decondition all of the inverters associated with the encoder 5 so that no selection will occur at all in the encoder 5. In succeeding recording cycles, a positive signal will always be sensed by the OR circuit 123 so that the conditions previously described will all be reversed so that at X time, the switch 35 is opened to permit a positive signal to be applied from its lower output to the inverter 31 where it is inverted to a negative signal to close switch 32 thereby effectively closing the write drive circuit for the encoder 5. At the same time, a negative signal is applied from the upper output of switch 35 to condition the inverters of the encoder 5 to permit selection of an order of the encoder 5.

When a word is to be read out of storage 1, the counter 6 starts counting from zero and therefore no delay is necessary in the first read out cycle as was the case in a recording cycle. Consequently, a negative signal is maintained on line E to decondition the AND circuit 72 regardless of the count in counter 6. Hence, at each X time, the switch 35 is opened to condition the encoder 5 to permit selection of an order line therein in a manner as previously described while, at each Y time, when a position in a word line of storage 1 is being operated upon, the switch 35 is closed to decondition the encoder 5 to prevent selection of an order line therein in a manner as previously described.

Counter

Refer now to FIG. 6d which shows the counter outlined in 6 in FIG. 1 which includes 4 triggers, 74, 75, 76 and 77.

The counter advance pulses are supplied by generator 78, controlled by the OR circuit 79 and the AND circuits 80 and 81.

When a word is to be recorded in storage 1, a positive signal is applied via line E to one input of AND circuit 81. During the first recording cycle the 12 complement of the digit which is to be recorded in storage 1 is entered in the counter 6. At X time of the last scanning cycle of the first recording cycle, a positive signal is applied via line 31DX to render the AND circuit 81 effective to apply a positive signal via OR circuit 79 to activate generator 78 to apply a counter advance pulse to the counter 6. In a similar manner, at X time of the last scanning cycle of each recording cycle a counter advance pulse is applied to advance the count of the counter 6 until a count of 12 is reached. At X time of the last scanning cycle (31DX) in which the counter 6 is standing at a count of 12, the generator 78 applies another counter advance pulse, in a manner as previously described, to advance the counter 6 to a count of 13. When the counter 6 is at a count of 13, triggers 74 and 77 are in their on state applying positive signals from their right hand outputs to AND circuit 204 and triggers 75 and 76 are in their off state applying positive signals from their left hand outputs to AND circuit 204. Further, since this is a recording cycle, a positive signal is maintained on line E which is also connected to the AND circuit 204. Thus, at Y time of the last scanning cycle (31DY), a positive signal is applied to render the AND circuit 204 effective to apply a STOP signal to the timing pulse generator 42 to stop the running of the clock therein and prevent further pulses from being applied to the line 31DX to advance the counter 6.

When a word is to be read out of storage 1, a positive signal is applied via line F to one input of AND circuit 80. So long as no carry is sensed, each time a subtraction has been successfully performed, a positive signal is maintained via line $\overline{C}$ at a second input of AND circuit 80. At X time of the last scanning cycle (31DX) of each read out operation, a positive signal is applied via line 31DX to render the AND circuit 80 effective to apply a positive signal via OR circuit 79 to activate generator 78 to apply a counter advance pulse to the counter 6. In a similar manner, at X time of the last scanning cycle of each read out cycle a counter advance pulse, is applied to advance the count of the counter 6 until an unsuccessful subtraction is sensed by the presence of a negative signal on line $\overline{C}$ which deconditions the AND circuit 80 to prevent the generator 78 being activated to apply a counter advance pulse to the counter 6. Since an unsuccessful subtraction is sensed, the device must go through another read out cycle, which will be an add cycle, during which, the binary equivalent of the order of the digit being processed is added back to the selected word in storage 1 to compensate for the excessive subtraction. Thus, as soon as the unsuccessful subtraction is sensed, a positive signal is applied via line C to one input of the AND circuit 116 in FIG. 6h. Also, since a read out operation is being performed a positive signal is applied via line F to a second input of AND circuit 116. Consequently, at Y time of the last scanning cycle of read out cycle in which the unsuccessful subtraction was sensed a positive pulse is applied via line 31DY to render AND circuit 116 effective to apply a positive signal to the right hand control input of the recomplement trigger 114. Therefore, a pulse on line CPC is effective to turn on trigger 114 which, in being turned on, applies a positive signal from its right hand output to one input of AND circuit 119. Since the device is at Y time, a positive signal is also applied via line Y to a second input of AND circuit 119. Since the CPD pulse occurs at the beginning of Y time and since the recomplement trigger 114 wasn't turned on until the middle of Y time of the last scanning cycle, another CPD pulse at Y time will not occur until the first scanning cycle (±D) of the next read out cycle. At that time, the positive pulse on the CPD line renders the AND circuit effective to apply a positive signal to the inverter 118 where it is inverted to a negative pulse to render diode 117 conductive to apply a negative pulse to the emitter of the emitter follower 17 and the base of the inverter 14 of trigger 113 causing the trigger 113 to be switched off whereby a positive signal is applied to the left hand output indicating an ADD operation which is now performed. Since an ADD operation is to be performed, a positive signal is applied via line ADD to one input of the AND circuit 206 and since the device is still in a read out operation, a positive signal is also applied via line F to a second input of the AND circuit 206. At Y time of the last scanning cycle (31DY) of this ADD read out operation, a positive signal is applied via line 31DY to render AND circuit 206 effective to apply a STOP signal to the timing pulse generator 42 to stop the running of the clock therein and prevent further pulses from being applied to the line 31DX to advance the counter 6.

Referring again to FIG. 6d, the triggers of counter 6 switch state owing to the pulses supplied by generator 78 provided their diode gates are positively conditioned. The first two triggers operate in binary, the right output of trigger 74 being wired to the gates of trigger 75 through OR circuit 82. Moreover, the right outputs of triggers 74 and 75 are wired to AND circuit 83, the output of which is applied to the lower left gates of triggers 76 and 77 and via OR circuits 84 and 85 to the lower right gates of triggers 76 and 77.

The right output of trigger 76 is wired, through OR circuit 86, to the upper right gate of 77 while the left output of trigger 76 is wired to the upper left gate of trigger 76 and the left output of trigger 77 to the upper right gate of trigger 76.

Operation of the counter 6 will be explained through the timing diagram of FIG. 16 in which respectively appear in 87, 88, 89, 90 the voltages on the right outputs of triggers 74, 75, 76, 77. This shows that the counter may have 16 different states, but in recording operations, counting is stopped at the end of the 12th count, as previously described, and in decimal read out operations the count does not go above 9.

*Operation of the counter in recording*

At the end of the first recording cycle, the counter is positioned according to the value read by the brushes in the record card. To this effect, a resistor decorder with two functions is used as an intermediary between the brushes and the counter 6; on one hand, it gives, according to code 1, 2, 4, 4 of the counter, the 12 complement value of the digit indicated by the picked up brush and, on the other hand, it supplies to the counter voltages which can be used by the transistors, while the voltages from the read brushes are not. The resistor decoder is shown at the bottom of FIG. 6e. In B1, B2 . . . B9, B±, appear the digit and sign read brushes. In I, II, IV$_A$, IV$_B$, the decoder outputs are respectively wired, through OR circuits 87, 82, 84 and 85 to the diode gates of triggers 74, 75, 76, 77. If, for example, a 7 is read, a pulse is emitted in B7, whence two pulses result in I and IV$_A$ the sum of which is 5 and is really the 12 complement of 7. The decoder comprises also diodes eliminating the spurious currents, which are not shown.

This positioning is performed on the first recording cycle owing to the output voltage of inverter 173 which blocks diodes 88, 89, 90 and 91 and allows the passage in OR circuits 87, 82, 84, 85 of the resistor decoder voltages. Moreover, on this first cycle, the control from inverter 73 applied to OR circuit 87 prevents the switching of the first trigger of the counter previously reset. On all the other recording cycles, counter 6 progresses normally, since diodes 88, 89, 90 and 91, being conductive, the negative voltage which they transmit prevents the action of outputs I, II, IV$_A$ and IV$_B$ of the resistor decoder.

Thus, if a 7 has been read in the record card, the counter is positioned on 5 on the first recording cycle and, on the other cycles, the machine performs the addition of the content of an encoder 5 line in the record word of storage 1, the counter 6 progressing one unit upon each cycle until it reaches its twelfth state. Thus, 12—5=7 additions will be performed.

*Operation of the counter in read out*

It has been stated that on the input of AND circuit 80 appear pulses 31DX (end of storage scanning), control F (read out) and control $\bar{c}$ which indicates that the content of a encoder line has been subtracted from a storage word without any carry. The counter will progress on each cycle until the subtraction is no longer possible (control $\bar{c}$ is then at low level). The right outputs of triggers 74, 75, 76, 77 are respectively wired to one of the inputs of OR circuits 92, 93, 94, 95 the other input of which is conditioned by the ouput of OR circuit 97. OR circuit 96, an input of which is wired to OR circuit 97, receives on its other input the left output of the sign trigger 110 of the arithmetic unit 7 and when its level is low it indicates that a — sign is to be punched. The output voltages of OR circuits 92 to 96 are respectively applied to inverters 98 to 102 followed by thyratrons 103 to 107. OR circuits 92 to 97 actually function as negative logical AND circuits. Thus, when the input levels are all low the output voltage of the inverters is high, hence the thyratrons fire. When firing, thyratrons 103, 104, 105, 106 respectively pick up relays RI, RII, RIVA and RIVB the contacts of which are wired as shown in FIG. 6j. It should be noted that this operation causes the number stored in counter 6, in codes 1, 2, 4, 4, to be switched to its 11 complement. The contacts of the relays then 11 recomplements the number into a decimal digit. Thus, for example, assume that the counter 6 stops at a count of 0101 (5) which will cause thyratrons 104 and 106 to be operated to pick up relays RII and RIVB thereby indicating the number 1010 (6) which is the 11 complement of the number in the counter 6. The contacts of the energized relays make providing a path from source 125, IVB.1, I.1, IVA.1, II.2 electromagnet E5 whereby the number represented by the relays 1010 (6) is 11 recomplemented to the decimal digit 5. The outputs of this decoder are wired to electromagnets E0, E9, E± for punching digits 0 to 9 and the sign. It is quite obvious that a relay decoder allowing to switch from another code to the decimal code according to the same principle, would not depart from the scope of the invention.

The transmission of the digits from the counter to the punch electro-magnets is thus performed by taking twice the 11 complement of this digit, a first time because the right outputs of the triggers with a low level are active to fire the thyratrons, a second time in the relay decoder.

*Sign read-out*

During Y time of the sign scanning cycle of the add cycle of a read out operation, the sign of the word to be read out is sensed and stored in trigger 109. Thus, if the stored sign was —, the trigger 109 is turned on whereas if + it remains off. At the same time, positive signals appear on lines ADD, F, ± D and Y rendering AND circuit 115 effective to apply a positive signal to the lower control inputs of the sign trigger 110. Now, if a — sign had been sensed by trigger 109, the connection to trigger 110 would cause a positive signal to appear at the upper right control input of trigger 110 otherwise the upper left control input of trigger 110 has a positive signal applied thereto. Hence a pulse on line CPC will cause trigger 110 to be turned on if a — sign had been sensed or remain off indicating a + sign. If the sign trigger 110 is turned on, a negative signal is applied to negatively condition the OR circuit 96. At the end of the read out operation trigger 114 is turned on causing a negative signal to be applied from its left output to one input of the OR circuit 97 and since a read out operation is being performed a negative signal is maintained on line $\overline{F}$ to render the OR circuit 97 effective to apply a negative signal to operate the negatively conditioned OR circuit 96 to apply a negative signal to the inverter 102 where it is inverted to a positive signal to fire the thyratron 107 and pick up sign relay R± whose contact ±1 then makes permitting the sign electromagnet E± to be energized and a hole punched in the sign column of the card.

*Recording and read out control of the arithmetic unit*

Figure 6H:
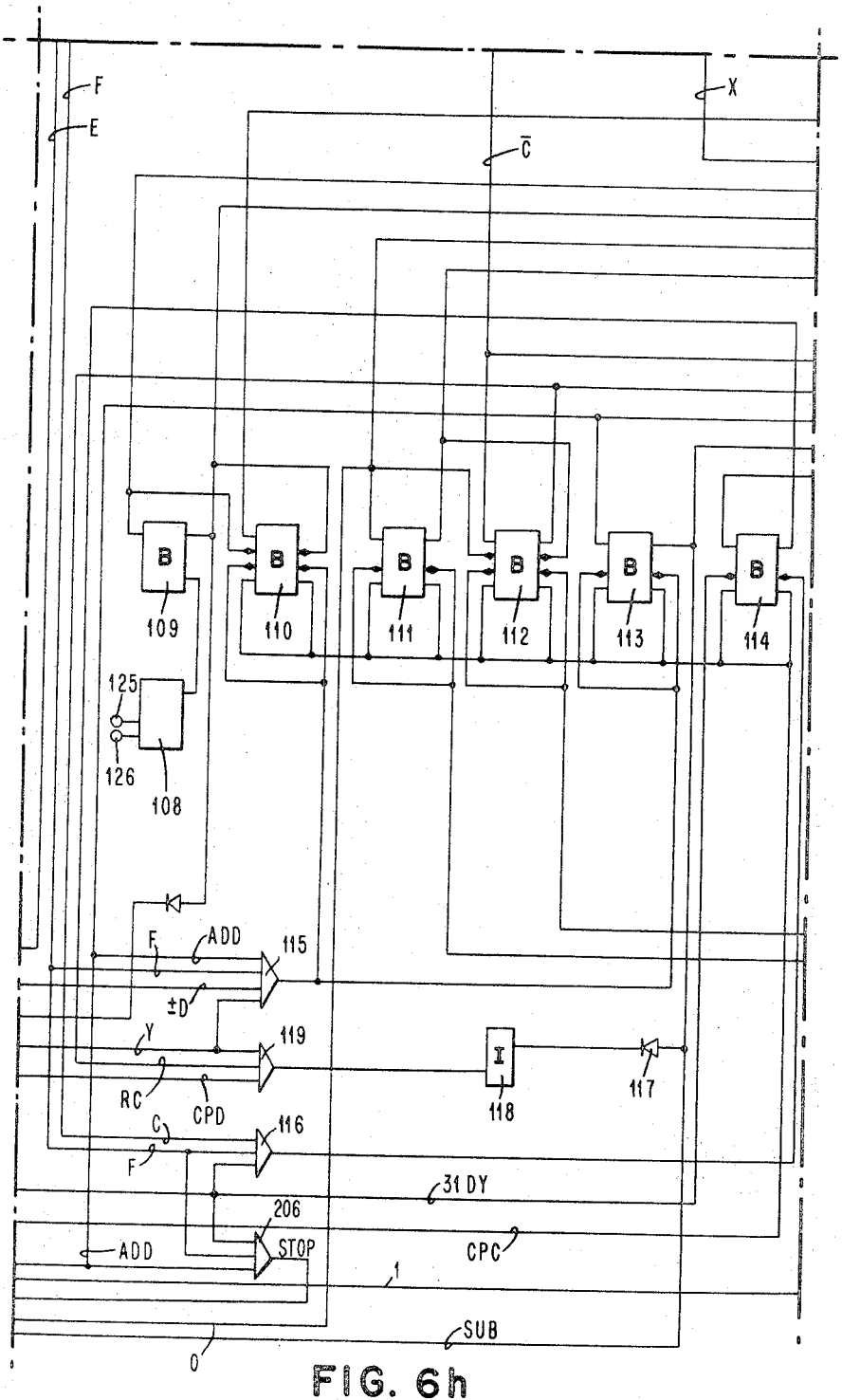
Figure 61:
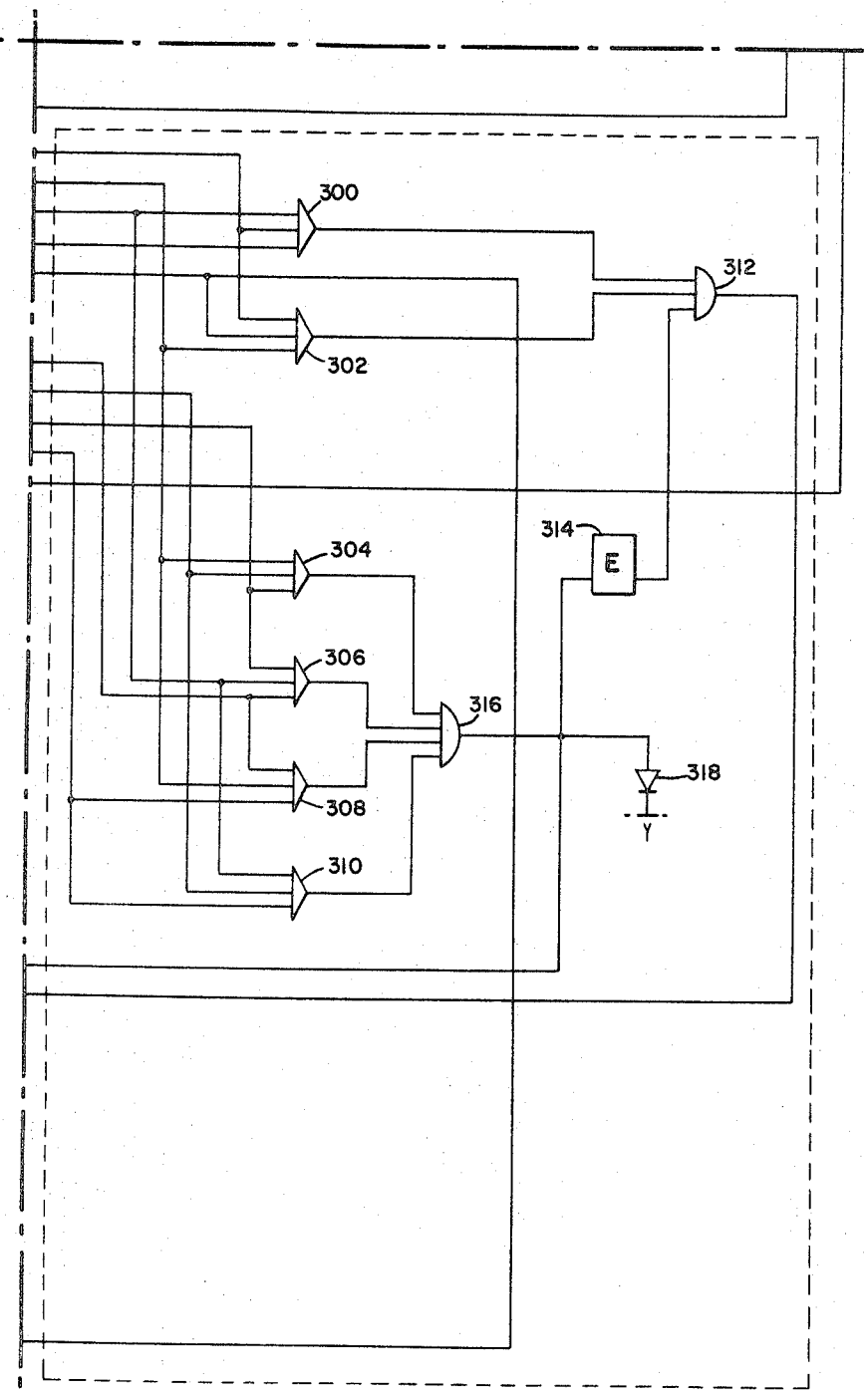

Refer now to FIGS. 6h and 6i which represent the main components of the arithmetic unit out of which will be described only those necessary to understand the read out and recording operations.

The unit comprises in 108 a read amplifier of known type on the input of which arrive both ends 125 and 126 of the sense wire S common to the storage 1 and the encoder 5. The output of read amplifier 108 is wired to the right input of trigger 109 so that, when there is a read pulse, the right output of trigger 109 is high. The right and left outputs of trigger 109 are respectively wired to the upper right and left diode gates of trigger 110, which is used, among other functions, to record the sign between its reading in storage 1 and its punching. The lower gates of trigger 110 are controlled by AND circuit 115 in a manner as previously described.

Trigger 111 performs the function of an accumulator. Its diode gates are wired to the output of the binary adder shown in FIG. 6i. Its right and left outputs are respectively wires to the upper right and left diode gates of trigger 112 which records the carries.

Trigger 113 indicates whether the machine is in an addition or subtraction operation. In the addition position, its right output voltage is low. It switches state at the beginning of each read out cycle when AND circuit 115 controls its diode gates. Trigger 114, when its right output voltage is high, indicates in read out that one subtraction too many has been performed. The left diode gate is systematically controlled on time 31DY (storage scanning end), thus resetting it.

The right gate of trigger 114 is wired to AND circuit 116 the inputs of which receive pulses 31DY, control F and the right output voltage of the carry trigger 112. When the three inputs are high, the right gate of trigger 114 is conditioned and the trigger 114 switches state during the advance pulse, the left output voltage goes low and indicates that the read out operation is over. This voltage, sent to OR circuit 97, controls the punching of the digit indicated by counter 6, in a manner as previously described. The invention of the present application is described by way of example in a particular data transfer system, and a more detailed description of this data transfer system and its operation is contained in the aforementioned parent application which is now U.S. Patent No. 3,132,245, as well as another divisional application, Ser. No. 247,970 filed Dec. 28, 1962, now U.S. Patent No. 3,242,325, and which was also divided from the aforementioned parent application.

Even though in the present invention, a description and a representation have been given of a device allowing the data of a record card to enter into a magnetic core storage and vice-versa the transfer into the card of the storage data, it is quite obvious that various omissions and substitutions, and changes in the form and details of the device illustrated and in its operations may be made by those skilled in the art, without departing from the scope of the invention. More particularly, the data may originally be transferred into recording element other than a punched card, provided the information in it be read in or out in series, the numeration system in the record card being of any type. The device may, according to very slight modifications, be adapted to British Measures for instance. Also, inside the device, the counter, and consequently the relay decoder as well as the resistor coder may operate according to any code.

What is claimed is:

1. In a data transfer device a radix converter consisting of an array arranged in rows and columns of wires with the rows representing the powers of a first radix and the columns representing the powers of a second radix including magnetic cores located at those intersections of said rows and columns where those powers of the second radix define the power of said first radix, means for selectively energizing jointly a predetermined row and column wire so that a core which is present at the selected intersection switches from a first state of magnetization to a second state and means associated with said array and responsive to said selected energizing means for producing a first or second signal depending upon whether a magnetic core is present at or absent from the selected intersection indicating the presence or absence respectively of the power of the second radix.

2. In a data transfer device a radix converter as set forth in claim 1 including means associated with said array and responsive to said selected energizing for reducing noise signals induced in said signal producing means due to the unselected magnetic cores which lie on the selected row and column wires.

3. In a data transfer device a radix converter consisting of an array arranged in rows and columns of wires with the rows representing the powers of a first radix and the columns representing the powers of a second radix including magnetic cores located at the intersection of predetermined ones of said rows and columns, means for selectively energizing jointly a predetermined row and the columns of said array and means associated with said array and responsive to said selective energizings for producing signals representing the second radix equivalent of the predetermined first radix power.

4. In a data transfer device a radix converter consisting of an array arranged in rows and columns of wires with the rows representing the powers of a first radix and the columns representing the powers of a second radix including magnetic cores located at those intersections of said rows and columns where those powers of the second radix define the power of said first radix, means for selectively energizing jointly a predetermined row wire and successive column wires so that cores which are present at the selected intersections switch from a first state of magnetization to a second state and means associated with said array and responsive to said selected energizings for producing successive first or second signals depending upon whether magnetic cores are present at or absent from the selected intersections indicating the presence or absence respectively of successive powers of the second radix.

5. In a data transfer device a magnetic core matrix consisting of an array of magnetic cores arranged in rows and columns, a first set of windings linking the cores in each row of said array, a second set of windings linking the cores of pairs of columns of said array and means for selectively energizing one of said windings of said first set and one of the windings of said second set in coincidence so that the magnetic effect due to the energized windings causes the core at the intersection of the selected row and one of the selected columns of said pair of columns to be switched from a first state of magnetization to a second state while the core at the intersection of the selected row and the other one of the selected columns is unaffected.

6. In a data transfer device a magnetic core matrix as set forth in claim 5 including means associated with said array for producing a signal indicating the change in state of magnetization of the selected core and means associated with selected windings for minimizing noise signals induced in said signal producing means due to the unselected cores which lie on the selected windings.

7. In a data transfer device a magnetic core matrix consisting of an array of magnetic cores arranged in rows and columns, a first set of windings linking the cores in each row of said array, a second set of windings linking the cores of pairs of columns of said array, a third set of windings linking the cores of said pairs of columns, means for selectively energizing one of said windings of said first set and one of the windings of said second set in coincidence so that the magnetic effect due to the energized windings causes the core at the intersection of the selected row and one of the selected columns of said pair of columns to be switched from a first state of magnetization to a second state while the core at the intersection of the selected row and the other one of the selected columns is unaffected and means for selectively energizing said one of said windings of said first set and one of the windings of said third set in coincidence so that the magnetic effect due to the energized windings causes the second mentioned core to be switched from a first state of magnetization to a second state while the first mentioned core is unaffected.

8. In a data transfer device a magnetic core matrix consisting of an array of magnetic cores arranged in rows and columns, a first set of windings linking the cores in each row of said array, a second set of windings linking the cores in each row of said array, a third set of windings linking the cores of pairs of columns of said array, means for selectively energizing one of said windings of said first set and one of the windings of said third set in coincidence so that the magnetic effect due to the energized windings causes the core at the intersection of the selected row and one of the selected columns of said pair of columns to change its state of magnetization while the core at the intersection of the selected row and the other one of the selected columns is unaffected and means for selectively energizing one of said windings of said second set corresponding to said one of said first set and said one of the windings of said third set in coincidence so that the magnetic effect due to the energized windings causes the second mentioned core to change its state of magnetization while the first mentioned core is unaffected.

9. In a data transfer device a magnetic core matrix consisting of an array of magnetic cores arranged in rows and columns, a first set of windings linking the cores in each row of said array, a second set of windings linking the cores in each row of said array, a third set of windings linking the cores of pairs of columns of said array, a fourth set of windings linking the cores of said pairs of columns, means for selectively energizing one of the windings of said first set and one of the windings of said third set in coincidence so that the magnetic effect due to the energized windings causes the core at the intersection of the selected row and one of the selected columns of said pair of columns to be switched from a first state of magnetization to a second state while the core at the intersection of the selected row and the other one of the selected columns is unaffected, and means for selectively energizing one of the windings of said second set corresponding to said one of said windings of said first set and one of the windings of said fourth set corresponding to said one of said windings of said third set in coincidence so that the magnetic effect due to the energized windings causes the first mentioned core to be switched back from the second state of magnetization to the first state while the second mentioned core remains unaffected.

10. In a data transfer device a magnetic core matrix as set forth in claim 9 including means for selectively energizing said one of said windings of said first set and said one of said windings of said fourth set in coincidence so that the magnetic effect due to the energized windings causes the second mentioned core to be switched from a first state of magnetization to a second state while the first mentioned core is unaffected, and means for selectively energizing said one of said windings of said second set and said one of said windings of said third set in coincidence so that the magnetic effect due to the energized windings causes the second mentioned core to be switched back from the second state of magnetization to the first state while the first mentioned core remains unaffected.

11. In a data transfer device a selection system comprising a first array arranged in rows and columns of windings including magnetic cores located at the intersection of predetermined ones of said rows and columns, a second array arranged in rows and columns of windings including magnteic cores located at each intersection of said rows and columns, the column windings of said second array corresponding in number to the column windings of said first array and being connected thereto, means connecting successive odd column windings of said arrays to successive even column windings to form pairs of column windings, means for selectively energizing one of the row windings of said first array and one of the pairs of column windings in coincidence so that the magnetic effect due to the energized windings causes a core if located at the intersection of the selected row and one of the columns of the selected pair to be switched from a first state of magnetization to a second state while a core if located at the intersection of the selected row and the other column of the selected pair is unaffected, and means for selectively energizing one of the row windings of said second array and said one of the pairs of column windings in coincidence so that the magnetic effect due to the energized windings causes the core at the intersection of the selected row and one of the columns of the selected pair to be switched from a first state of magnetization to a second state while the core at the intersection of the selected row and the other column of the selected pair is unaffected.

12. In a data storage device a selection matrix comprising an array of wires arranged in rows and columns including a plurality of pairs of serially connected impedance elements for each row corresponding in number to the number of columns of said array with the end of one element connected to the row wire and the end of the other element connected to a corresponding column wire, a plurality of first control means corresponding to the rows of said array each having a first, second and third input and an output, a plurality of second control means corresponding to the columns of said array each having a first, second and third input and an output, means connecting each row wire to one input of the corresponding first control means, means connecting each column wire to one input of the corresponding second control means, a first signal source means for commonly connecting said first signal source to the second input of said first and second control means, a second signal source, means for commonly connecting said second signal source to the third input of said first and second control means, and means for selectively applying a signal to the junction of a predetermined pair of said serially connected impedance elements causing a first signal to be produced at the output of the first control means associated with the row wire connected to said predetermined pair indicating the selected row and a second signal to be produced at the output of the second control means associated with the column wire connected to said predetermined pair indicating the selected column.

13. In a data transfer device a code converter for converting a first plurality of signals representative of a number in a first code to a second plurality of signals representative of the N complement of said number in a second code comprising signalling means for producing said first plurality of signals, a plurality of control means equal in number to said second plurality of signals and means selectively connecting said signalling means to said plurality of control means to produce at the outputs thereof said second plurality of signals, said plurality of control means comprising an array of magnetic core elements having a predetermined number of rows and columns, said core elements being arranged on the rows and columns in accordance with said first and second codes, respectively.

References Cited

UNITED STATES PATENTS

| | | | |
|---|---|---|---|
| 2,685,084 | 7/1954 | Lippel et al. | 340—347 |
| 2,997,705 | 8/1961 | Freedman | 340—347 |

MAYNARD R. WILBUR, *Primary Examiner.*

MALCOLM A. MORRISON, *Examiner.*

L. W. MASSEY, A. L. NEWMAN, W. J. KOPACZ, *Assistant Examiners.*